US009210410B2

(12) United States Patent
Shimoyama et al.

(10) Patent No.: US 9,210,410 B2
(45) Date of Patent: Dec. 8, 2015

(54) IMAGE DISPLAY APPARATUS AND METHOD, COMPUTER PROGRAM PRODUCT, AND IMAGE PROCESSING DEVICE

(75) Inventors: Kenichi Shimoyama, Tokyo (JP); Ryusuke Hirai, Tokyo (JP); Takeshi Mita, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 310 days.

(21) Appl. No.: 13/407,019

(22) Filed: Feb. 28, 2012

(65) Prior Publication Data
US 2013/0155051 A1 Jun. 20, 2013

(30) Foreign Application Priority Data
Dec. 14, 2011 (JP) ................................. 2011-273235

(51) Int. Cl.
*H04N 13/04* (2006.01)
(52) U.S. Cl.
CPC ....... *H04N 13/0404* (2013.01); *H04N 13/0415* (2013.01); *H04N 13/0468* (2013.01); *H04N 13/0475* (2013.01); *H04N 13/0477* (2013.01)
(58) Field of Classification Search
USPC ......................................................... 348/51
See application file for complete search history.

(56) References Cited

U.S. PATENT DOCUMENTS

| 6,198,484 B1 * | 3/2001 | Kameyama ................... 345/419 |
| 6,388,639 B1 * | 5/2002 | Hoshino et al. .................. 345/8 |
| 2008/0314324 A1 * | 12/2008 | Pettersson et al. ......... 119/14.08 |
| 2009/0219484 A1 * | 9/2009 | Ebisawa ........................ 351/210 |
| 2010/0007751 A1 * | 1/2010 | Icho et al. .................. 348/222.1 |

FOREIGN PATENT DOCUMENTS

JP 3443271 6/2003

OTHER PUBLICATIONS

Zhang, Zhengyou, "A Flexible New Technique for Camera Calibration", IEEE Transactions on Pattern Analysis and Machine Intelligence, vol. 22, No. 11:1330-1334, 21 pages (2000).
Office Action mailed Jul. 29, 2014 by the Japanese Patent Office in corresponding Japanese Patent Application No. 2011-273235.

* cited by examiner

*Primary Examiner* — Tracy Li
(74) *Attorney, Agent, or Firm* — Finnegan, Henderson, Farabow, Garrett & Dunner, L.L.P.

(57) ABSTRACT

According to one embodiment, an image display apparatus includes a displaying device capable of displaying a three-dimensional image; a detector configured to detect a viewer; an obtaining device configured to obtain, on the basis of a detection result from the detector, a second position of the viewer in a second coordinate system fixed to the detector; a first calculator configured to calculate a difference between a first position in a first coordinate system fixed to the displaying device and the second position; and a second calculator configured to calculate a correction value for at least one of a set position of a viewing zone in which the viewer can view the three-dimensional image and the second position so as to compensate for the difference.

11 Claims, 15 Drawing Sheets

SA (S)    SD (S)    SE (S)

LARGE SHIFTED AMOUNT

SMALL SHIFTED AMOUNT

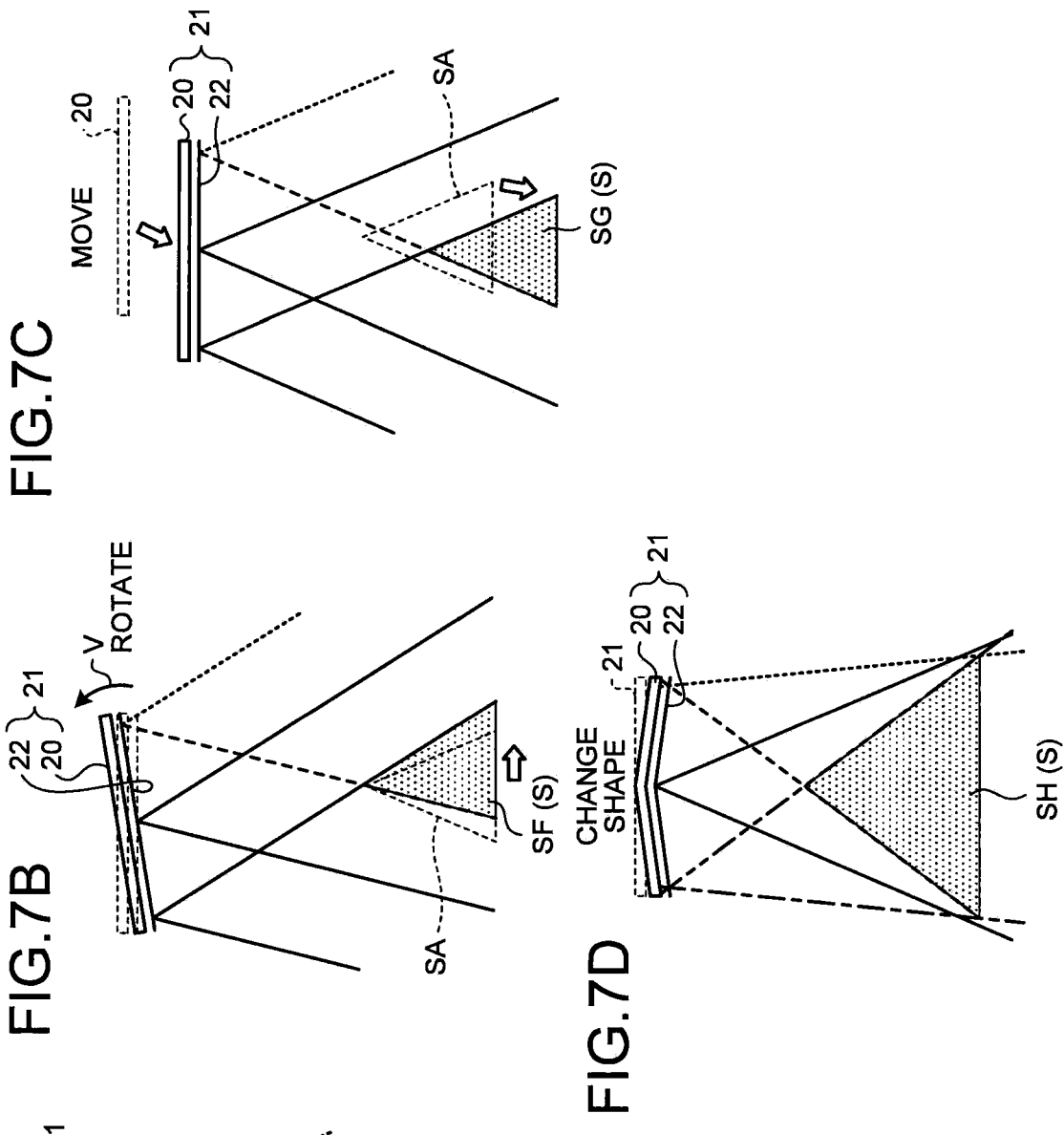

IMAGE DISPLAY APPARATUS AND METHOD, COMPUTER PROGRAM PRODUCT, AND IMAGE PROCESSING DEVICE

CROSS-REFERENCE TO RELATED APPLICATION(S)

This application is based upon and claims the benefit of priority from Japanese Patent Application No. 2011-273235, filed on Dec. 14, 2011; the entire contents of which are incorporated herein by reference.

FIELD

Embodiments described herein relate generally to an image display apparatus, an image display method, a computer program product, and an image processing device.

BACKGROUND

With image display apparatuses displaying three-dimensional images, viewers can view the three-dimensional images with naked eyes without using special glasses. Such an image display apparatus displays a plurality of images from different viewpoints, and controls light beams for the images with a parallax barrier or a lenticular lens, for example. The controlled light beams are guided to the eyes of a viewer. If the viewing position of the viewer is appropriate, the viewer can recognize a three-dimensional image. A region where a viewer can view a three-dimensional image in this manner is referred to as a viewing zone.

There is, however, a disadvantage that the viewing zone is limited. For example, there exists a region where a point of view of an image perceived by the left eye is relatively on the right of a point of view of an image perceived by the right eye. Such a pseudoscopic region that is a viewing position where the three-dimensional image cannot be correctly recognized exists in the real space. Accordingly, the viewing zone is set according to the position of the viewer.

For example, the position of the viewer is detected by a sensor, and the position of the viewing zone is obtained according to the position of the viewer by replacing the image for the right eye and the image for the left eye with each other. A method for correcting a deviation of a panel optical axis of a displaying device in an image display apparatus has also been disclosed. In addition, a method for estimating the posture of a camera that detects the position of the viewer has also been disclosed. The detected position of the viewer can be corrected by using the estimation result.

In the related art, however, when a design error at the displaying device displaying a three-dimensional image and an installation error of a detector detecting the viewer occurred at the same time, the displaying device and the detector need to be adjusted separately.

BRIEF DESCRIPTION OF THE DRAWINGS

FIGS. 7A to 7D are explanatory diagrams of set positions and set ranges of the viewing zone according to the first embodiment.

DETAILED DESCRIPTION

In general, according to one embodiment, an image display apparatus includes a displaying device capable of displaying a three-dimensional image; a detector configured to detect a viewer; an obtaining device configured to obtain, on the basis of a detection result from the detector, a second position of the viewer in a second coordinate system fixed to the detector; a first calculator configured to calculate a difference between a first position in a first coordinate system fixed to the displaying device and the second position; and a second calculator configured to calculate a correction value for at least one of a set position of a viewing zone in which the viewer can view the three-dimensional image and the second position so as to compensate for the difference.

Various embodiments will be described hereinafter with reference to the accompanying drawings.

An image processing device according to a first embodiment is put in use in an image display apparatus such as a television (TV) set, a personal computer (PC), a smart phone, or a digital photo frame that enables a viewer to view three-dimensional images with naked eyes. A three-dimensional image is an image including a plurality of parallax images each having a mutually different parallax. Note that images mentioned in the embodiments may be either static images or moving images.

Figure 1:
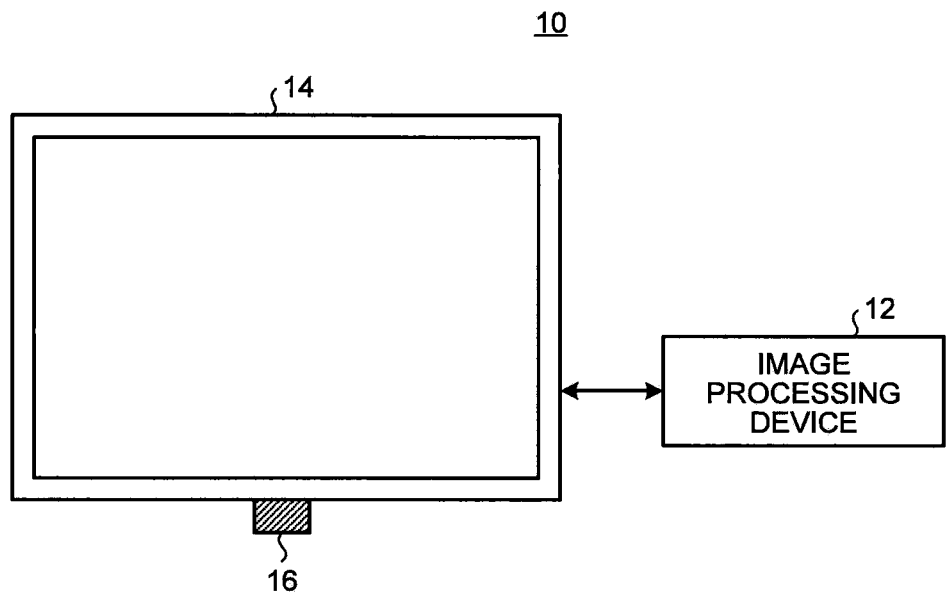
FIG. 1 is a diagram of an image display apparatus according to a first embodiment.

FIG. 1 is a schematic diagram of an image display apparatus 10 according to the first embodiment. The image display apparatus 10 includes a display device 14, a detector 16 and an image processing device 12.

Figure 2:
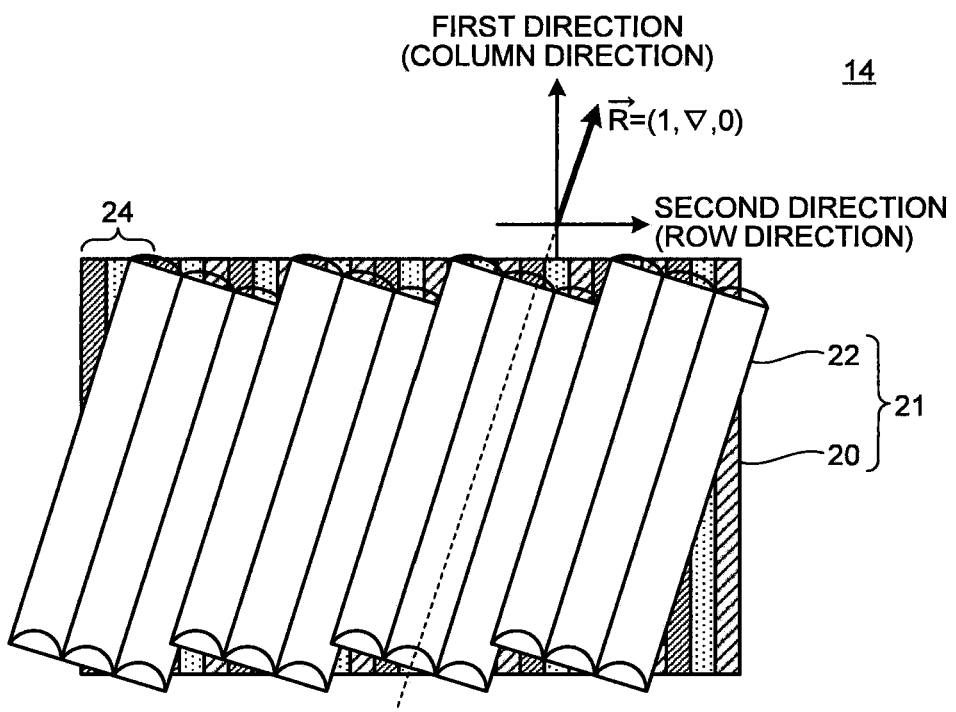
FIG. 2 is a diagram of a display device according to the first embodiment.

FIG. 2 is a schematic diagram of the display device 14. As illustrated in FIG. 2, the display device 14 includes a displaying device 21 configured to display three-dimensional images. A three-dimensional image is an image including a plurality of parallax images each having a mutually different parallax. The displaying device 21 employs a 3D display system such as the integral imaging system (II system) or the multi-view system.

The displaying device 21 includes a display element 20 and a light beam controller 22. The display element 20 is a liquid crystal panel in which a plurality of sub-pixels having color components (such as R, G, and B) are arranged in a matrix in a second direction (for example, in the row direction (in the horizontal direction) with reference to FIG. 2) as well as in a first direction (for example, ing the column direction (in the vertical direction) with reference to FIG. 2). In this case, sub-pixels each of R, G, and B arranged in the second direction constitute one pixel. An image displayed by a pixel group in which adjacent pixels are arranged in the second direction where the number of pixels corresponds to the number of parallaxes is referred to as an element image 24. The array of the sub-pixels of the display element 20 may be another known array. Furthermore, the colors of the sub-pixels are not limited to three colors of R, G and B. For example, four or more colors may be used.

The display element 20 may be a direct-view two-dimensional display, such as an organic electro luminescence (organic EL), a liquid crystal display (LCD), a plasma display panel (PDP), or a projection display. Alternatively, the display element 20 may include a backlight.

The light beam controller 22 is disposed opposite to the display element 20 with a space therebetween. The light beam controller 22 controls the outgoing direction of the light beam coming out from each sub-pixel of the display element 20. In the light beam controller 22, a plurality of optical openings, each extending in a linear fashion and each allowing a light beam to go out therethrough, is arranged along the second direction. For example, the light beam controller 22 may be a lenticular sheet having a plurality of cylindrical lenses arranged thereon. Alternatively, the light beam controller 22 may also be a parallax barrier having a plurality of slits arranged thereon. The optical openings are arranged to correspond to the element images 24 of the display element 20, respectively.

Figure 3:
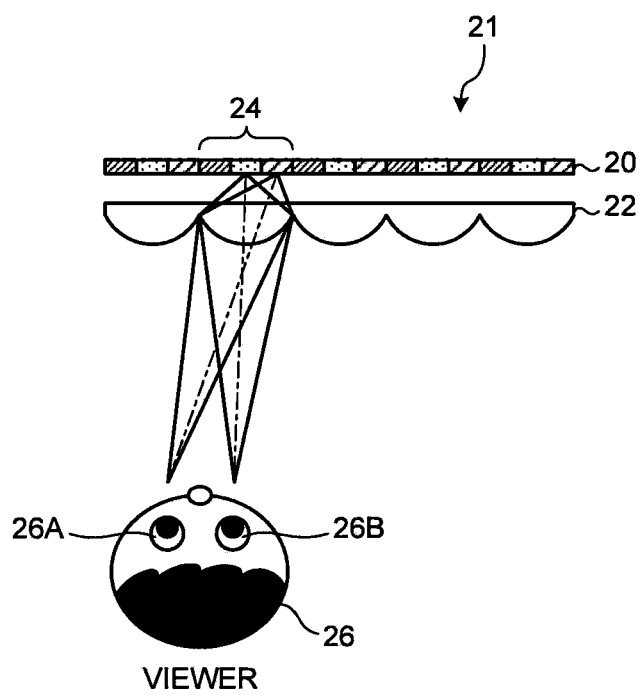
FIG. 3 is a diagram of a displaying device according to the first embodiment.

FIG. 3 is a schematic diagram illustrating a state in which the viewer views the displaying device 21. A plurality of element images 24 is displayed on the display element 20. Then, a group of parallax images (multiparallax image) corresponding to a plurality of parallax directions is displayed on the display element 20. Light beams of the multiparallax image pass through the optical openings of the light beam controller 22. Thus, a viewer 26 positioned within the viewing zone views different pixels included in the element images 24 with the left eye 26A and the right eye 26B, respectively. As described above, as a result of displaying images with different parallaxes for the left eye 26A and the right eye 26B of the viewer 26, the viewer 26 can observe a three-dimensional image. A region where a viewer can observe a three-dimensional image in the real space is referred to as a viewing zone.

The viewing zone is defined by a combination of display parameters of the displaying device 21. Accordingly, the display device 14 can set the viewing zone by setting the display parameters of the displaying device 21.

Examples of the display parameters include the relative position between the display element 20 and the light beam controller 22, the distance between the display element 20 and the light beam controller 22, the angle of the displaying device 21, a change in the shape of the displaying device 21, and the pitch of pixels in the display element 20.

The relative position of the display element 20 and the light beam controller 22 represents the position of a corresponding element image 24 with respect to the center of the openings of the light beam controller 22. The distance between the display element 20 and the light beam controller 22 represents the shortest distance between the openings of the light beam controller 22 and corresponding element images 24. The angle of the displaying device 21 represents the angle of rotation of the displaying device 21 around the vertical direction as the rotation axis with respect to a predetermined reference position. A change in the shape of the displaying device 21 represents changing the shape of the body of the displaying device 21. The pitch of pixels in the display element 20 represents the interval between pixels of each element image 24 of the display element 20. The region where a viewing zone S is set in the real space is uniquely defined by combining these display parameters.

FIGS. 4A to 7D are diagrams for explaining control of the set position and the set range of the viewing zone S by adjusting the display parameters of the displaying device 21.

FIGS. 4A to 7D illustrate the relations between the display element 20 and the light beam controller 22 of the displaying device 21. In addition, enlarged views of parts of the element images 24 are illustrated in FIGS. 4A to 7D where appropriate.

First, a case where the set position or the like of the viewing zone S is controlled by adjusting the distance between the display element 20 and the light beam controller 22 and the relative position of the display element 20 and the light beam controller 22 will be described with reference to FIGS. 4A to 4C.

Figure 4A:
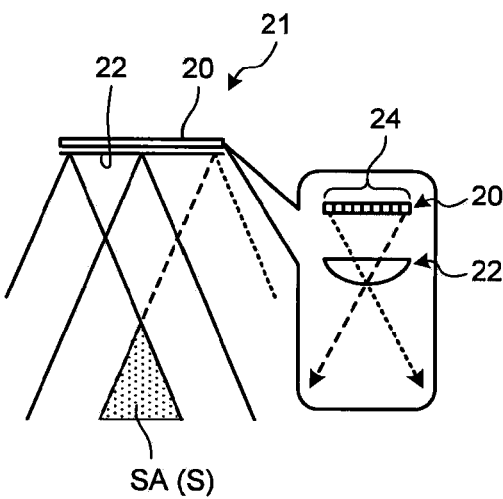
FIGS. 4A to 4C are explanatory diagrams of set positions and set ranges of a viewing zone according to the first embodiment.

FIG. 4A is a diagram illustrating abasic positional relation of the displaying device 21 and its viewing zone S (a viewing zone SA). FIG. 4B is a diagram illustrating a case where the distance between the display element 20 and the light beam controller 22 is shorter than that in FIG. 4A.

Figure 4B:
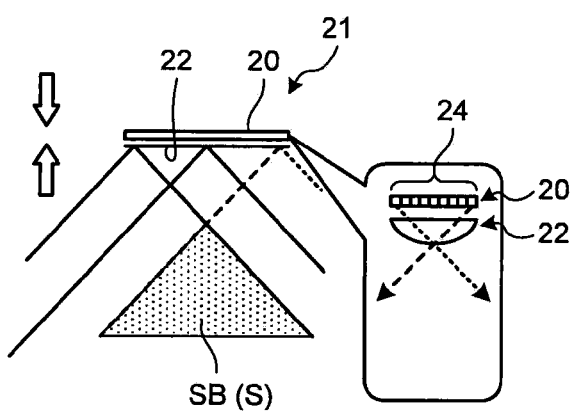

As illustrated in FIGS. 4A and 4B, the viewing zone S can be set at a position nearer to the displaying device 21 as the distance between the display element 20 and the light beam controller 22 is shorter (see the viewing zone SA in FIG. 4A, and a viewing zone SB in FIG. 4B). Conversely, the viewing zone S can be set to a position farther from the displaying device 21 as the distance between the display element 20 and the light beam controller 22 is longer.

Figure 4C:
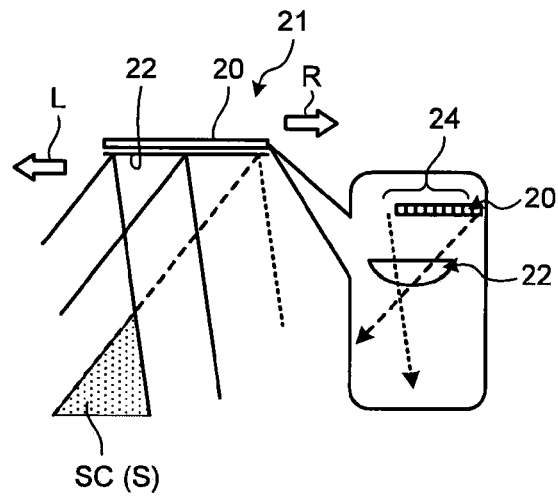

FIG. 4C is a diagram illustrating a case where the relative position of the display element 20 with respect to the light beam controller 22 is moved rightward (see the direction of an arrow R in FIG. 4C) as compared to FIG. 4A. As illustrated in FIGS. 4A and 4C, as the display element 20 is moved rightward relative to the light beam controller 22, the viewing zone S moves leftward (the direction of an arrow L in FIG. 4C) (see a viewing zone SC in FIG. 4C). Conversely, as the relative position of the display element 20 with respect to the light beam controller 22 is moved leftward as compared to FIG. 4A, the viewing zone S moves rightward (not illustrated).

Next, a case where the position or the like where the viewing zone S is set is controlled by adjusting the pitch of pixels (the arrangement of pixels) displayed on the display element 20 will be described with reference to FIGS. 5 to 6C.

Figure 5:
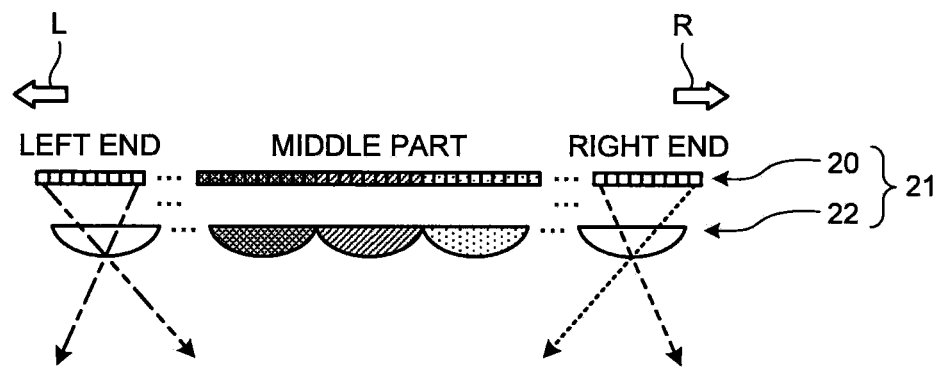
FIG. 5 is an explanatory diagram of a set position and a set range of the viewing zone according to the first embodiment.
Figures 6A, 6B, 6C:
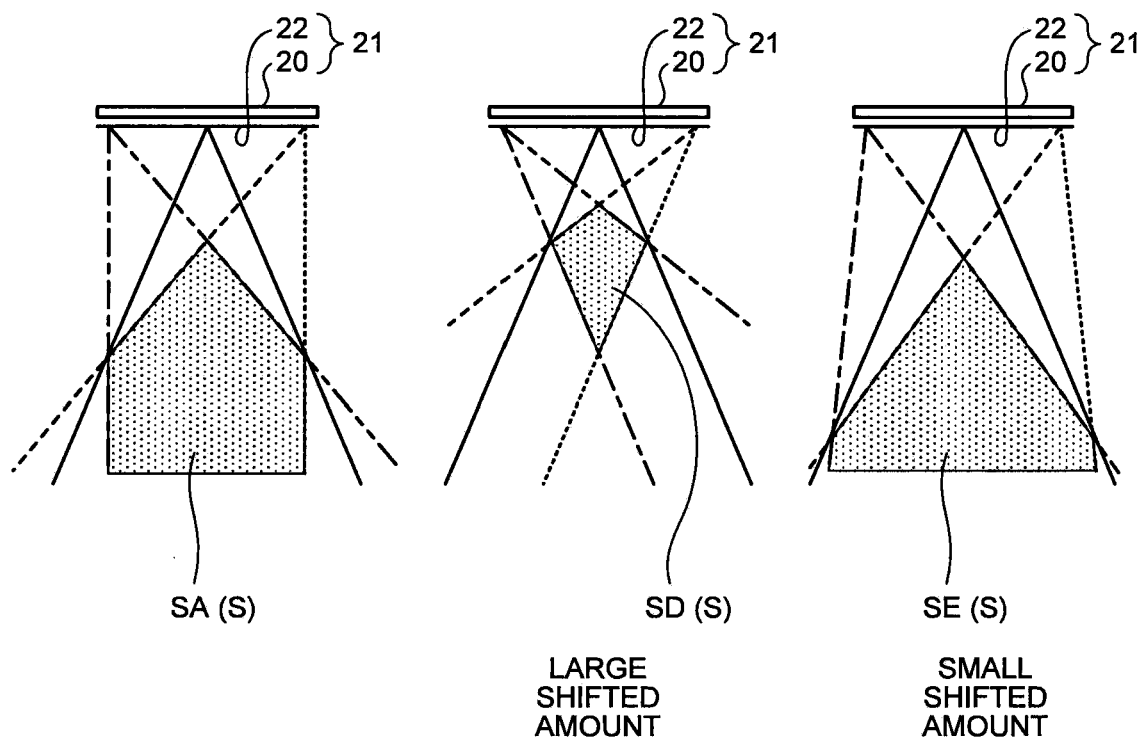
FIGS. 6A to 6C are explanatory diagrams of set positions and set ranges of the viewing zone according to the first embodiment.

FIG. 5 is an enlarged view of the pixels of the display element 20 and the light beam controller 22 in the displaying device 21. FIG. 6A is a diagram illustrating a basic positional relation of the displaying device 21 and its viewing zone S (the viewing zone SA). The positions of the pixels in the display element 20 and the light beam controller 22 are more largely shifted relative to each other at positions nearer to the ends (a right end (an end in the direction of the arrow R in FIG. 5) and a left end (an end in the direction of the arrow L in FIG. 5)) of the screen of the display element 20. Then, the viewing zone S moves to a position nearer to the displaying device 21 and the width of the viewing zone S becomes smaller (see a viewing zone SD in FIG. 6B). Note that the width of the viewing zone S represents the maximum length in the horizontal direction of each viewing zone S. The width of the viewing zone S may be referred to as a viewing zone setting distance.

Conversely, the amount by which the positions of the pixels in the display element 20 and the light beam controller 22 are relatively shifted is set to be smaller at positions nearer to the ends of the screen of the display element 20. Then, the viewing zone S moves to a position farther from the displaying device 21 and the width of the viewing zone S becomes larger (see a viewing zone SE in FIG. 6C).

Next, a case where the position or the like where the viewing zone S is set is controlled by adjusting the angle of the displaying device 21, a change in the shape of the displaying device 21, and the relative positions of the display element 20 and the light beam controller 22 will be described with reference to FIGS. 7A to 7D.

FIG. 7A is a diagram illustrating a basic positional relation of the displaying device 21 and its viewing zone S (the viewing zone SA). FIG. 7B is a diagram illustrating a state where the displaying device 21 is rotated (in the direction of an arrow V in FIG. 7B). As illustrated in FIGS. 7A and 7B, as a result of adjusting the angle of the displaying device 21 by rotating the displaying device 21, the position of the viewing zone S moves from the viewing zone SA to a viewing zone SF.

FIG. 7C is a diagram illustrating a state where the position and the orientation of the display element 20 with respect to the light beam controller 22 are adjusted. As illustrated in FIG. 7C, as a result of changing the position and the orientation of the display element 20 with respect to the light beam controller 22, the viewing zone S moves from the viewing zone SA to the viewing zone SG.

FIG. 7D is a diagram illustrating a state where the shape of the entire displaying device 21 is changed. As illustrated in FIGS. 7A and 7D, as a result of changing the shape of the displaying device 21, the viewing zone S changes from the viewing zone SA to a viewing zone SH.

As described above, the region (the position, the size, and the like) where the viewing zone S is set in the real space is uniquely defined by combining these display parameters of the displaying device 21.

The description is continued referring back to FIG. 2. In this embodiment, the displaying device 21 displays a three-dimensional image having different viewing zones S for different heights.

Specifically, the displaying device 21 is provided so that the extending direction (see a vector R in FIG. 2) of the optical openings of the light beam controller 22 is provided to have a predetermined slope with respect to the first direction of the display element 20. Although a case where the optical openings of the light beam controller 22 are arranged to have a predetermined slope with respect to the first direction of the display element 20 in this embodiment, the configuration may be such that the optical openings are not tilted.

In the example illustrated in FIG. 2, the vector R representing the extending direction of the optical openings of the light beam controller 22 is expressed by the following formula (1):

$$\vec{R} = (1, \nabla, 0) \quad (1)$$

When the optical openings of the light beam controller 22 are arranged with a slope with respect to the first direction of the display element 20, the positions in the row direction (the second direction) of the optical openings of the light beam controller 22 and those of the element images 24 and the sub-pixels of the display element 20 are shifted. Accordingly, the position of the viewing zone for the displaying device 21 varies depending on the height.

FIGS. 8 to 11 are schematic diagrams illustrating the relation between the displaying device 21 and the set position of the viewing zone in a world coordinate system.

The world coordinate system is defined as follows in this embodiment. In this embodiment, a coordinate system in which the center of a display surface (display) of the displaying device 21 is the origin, the horizontal direction of the display surface is the X axis, the vertical direction of the display surface is the Y axis, and the normal direction of the display surface is the Z axis is the world coordinate system. In addition, position coordinates in the world coordinate system are represented by (X, Y, Z) in this embodiment. Furthermore, the height direction refers to the Y axis direction in the world coordinate system in this embodiment. Note that the method for setting coordinates in the real space is not limited to the above.

Figure 8:
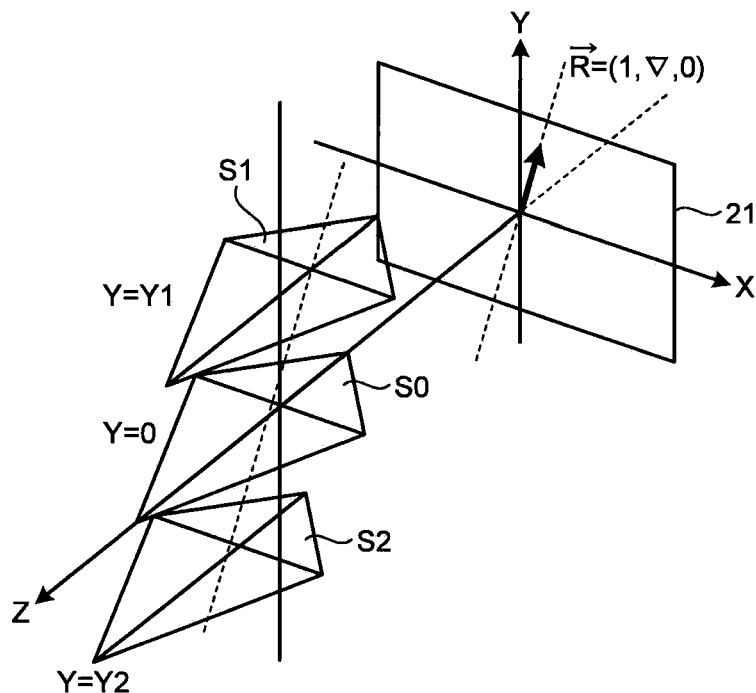
FIG. 8 is a diagram illustrating the relation between the displaying device and the set positions of the viewing zone according to the first embodiment.

FIG. 8 is a schematic diagram illustrating a plurality of viewing zones (a viewing zone S1, a viewing zone S0 and a viewing zone S2) with different heights. For collectively explaining viewing zones that are set, such viewing zones will be simply referred to as a viewing zone S in the explanation. In FIG. 8, the viewing zone S1 is on a XZ plane where the Y axis position coordinate is Y1 (Y=Y1). The viewing zone S0 is on a XZ plane where the Y axis position coordinate is 0 (Y=0). The viewing zone S2 is on a XZ plane where the Y axis position coordinate is Y2 (Y=Y2). The description will be made here assuming that Y1>0>Y2.

In the example illustrated in FIG. 8, the distance from the display surface of the displaying device 21 to the viewing zone S1, the distance from the display surface of the displaying device 21 to the viewing zone S2, and the distance from the display surface of the displaying device 21 to the viewing zone S0 are equal.

Figure 9:
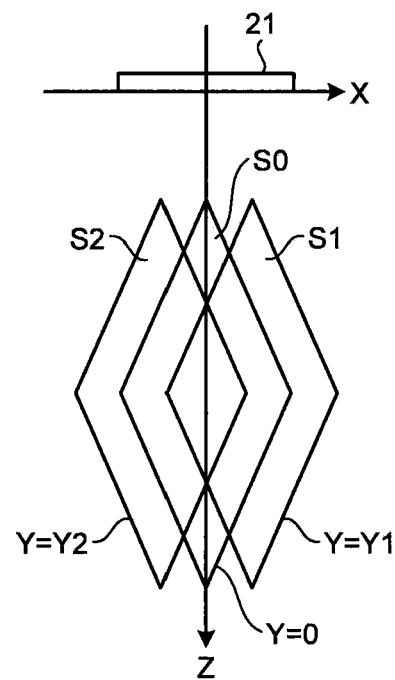
FIG. 9 is a diagram illustrating the relation between the displaying device and the set positions of the viewing zone according to the first embodiment.
Figure 10:
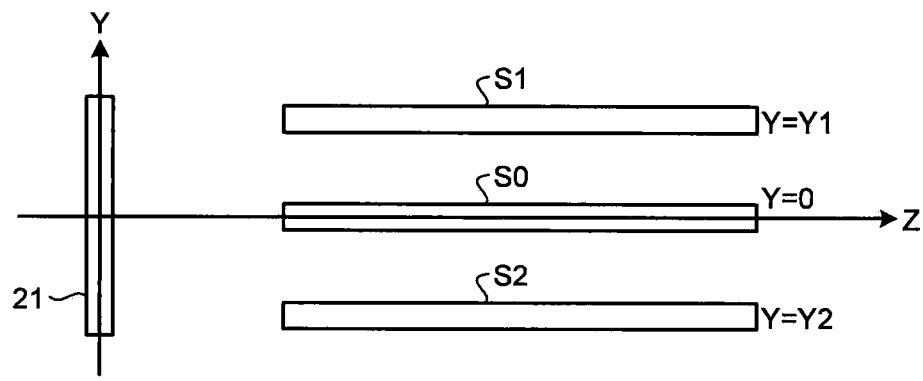
FIG. 10 is a diagram illustrating the relation between the displaying device and the set positions of the viewing zone according to the first embodiment.
Figure 11:
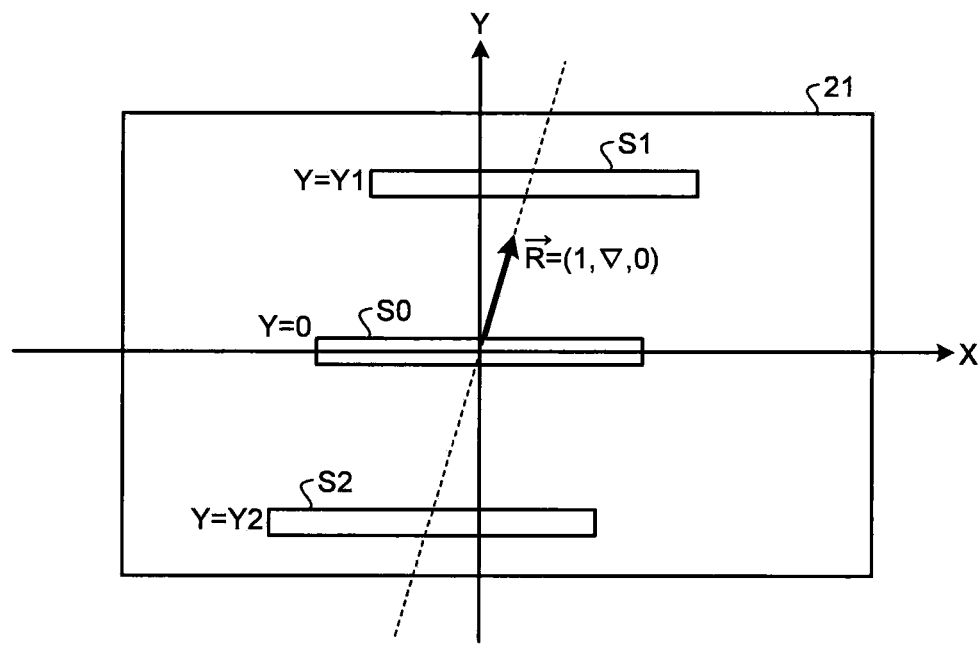
FIG. 11 is a diagram illustrating the relation between the displaying device and the set positions of the viewing zone according to the first embodiment.

FIG. 9 is a XZ plane plan view schematically illustrating a state where the viewing zones S1, S0 and S2 are viewed from above (in the Y axis direction). As illustrated in FIG. 9, the viewing zones S1, S0 and S2 are shifted relative to one another in the X direction. FIG. 10 is a YZ plane plan view schematically illustrating a state where the viewing zones S1, S0 and S2 are viewed laterally (in the X axis direction). As illustrated in FIG. 10, the viewing zones S1, S0 and S2 are at the same position in the Y axis direction. FIG. 11 is a XY plane plan view schematically illustrating a state where the viewing zones S1, S0 and S2 are viewed from the front (in the Z direction). As illustrated in FIG. 11, the shifts according to the heights of the viewing zones S1, S0 and S2 are along the vector R that is a slope of the light beam controller 22 with respect to the display element 20.

The shift amounts according to the heights of the viewing zones S1, S0 and S2 can thus be calculated from the differences in heights of the viewing zones S1, S0 and S2 and the slope of the vector R. In other words, in the example illustrated in FIGS. 8 to 11, the viewing zones S1, S0 and S2 can be said to extend obliquely along the vector R in the height direction (Y axis direction).

Figure 12:
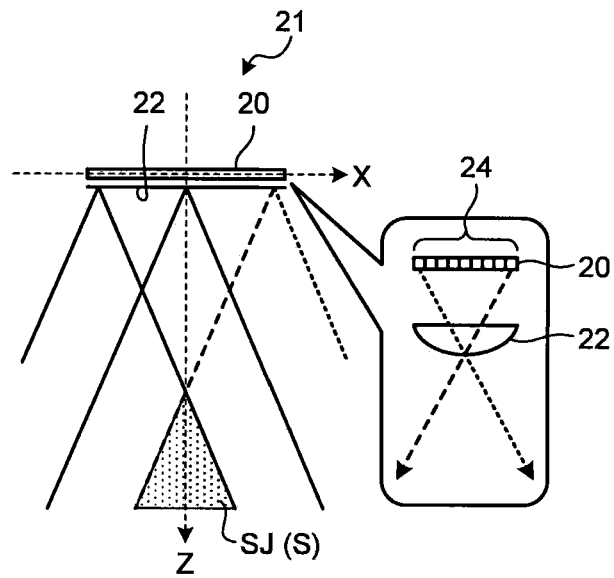
FIG. 12 is a diagram illustrating the positional relation between a display element and a light beam controller according to the first embodiment.

FIG. 12 is a schematic diagram illustrating the positional relation between the display element 20 and the light beam controller 22 in the displaying device 21. It is assumed that the displaying device 21 is designed in advance so that right in front of the displaying device 21 at a Y axis position coordinate 0 (Y=0) is the set position of the viewing zone S (see a viewing zone SJ in FIG. 12). Note that right in front refers to a direction passing through the center of the display surface of the displaying device 21 and perpendicular to the display surface. The set position of the viewing zone S when designing the displaying device 21 may be any position in the real space. Specifically, the set position of the viewing zone S when designing the displaying device 21 may be a position other than right in front of the display surface of the displaying device 21, and the height thereof is not limited.

There may be a case where the viewing zone S of the displaying device 21 is not set to the set position of the design. For example, the optical openings of the light beam controller 22 may be provided at positions shifted from the positions for setting the viewing zone S to the set position of the design.

Figure 13:
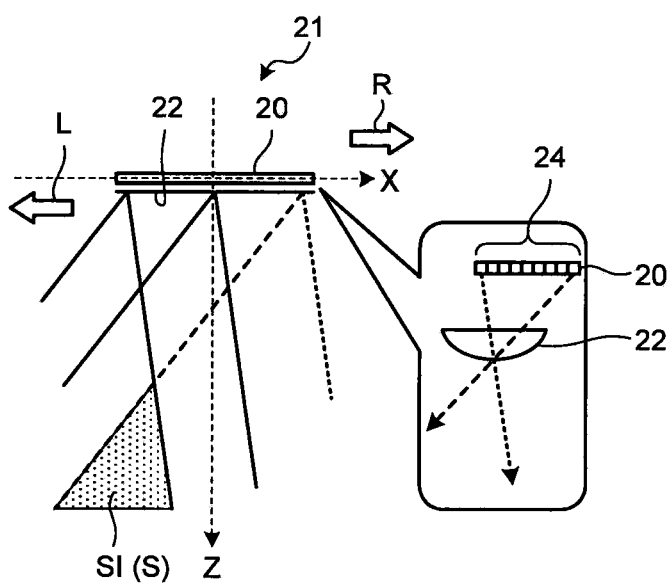
FIG. 13 is a diagram illustrating the positional relation between the display element and the light beam controller according to the first embodiment.

FIG. 13 is a schematic diagram illustrating a case where the relative position of the light beam controller 22 with respect to the display element 20 is shifted leftward (see the direction of an arrow L in FIG. 13) as compared to the case in FIG. 12. As illustrated in FIG. 13, as the light beam controller 22 is shifted leftward relative to the display element 20, the viewing zone S is also shifted leftward (see a viewing zone SI in FIG. 13) as compared to the set position in FIG. 12 (see the viewing zone SJ in FIG. 12).

Accordingly, when the displaying device 21 displays a three-dimensional image where a position (X, Y, Z) in the world coordinate system is set to the viewing zone S as designed, the viewing zone S is actually set to a position (X, Y, Z) in a first coordinate system (details of which will be described later) of the displaying device 21. If the panel optical axis according to the design and the actual panel optical axis are shifted from each other, the set position of the viewing zone S as designed and the actual set position of the viewing zone S are shifted from each other. The shift of the panel optical axis according to the design and the actual panel optical axis from each other is caused when the attaching position of the display element 20 and the light beam controller 22 in the manufacture is shifted from that according to the design. As a result, if such a shift is caused, the viewing zone may be actually set to a set position different from that according to the design even if the displaying device 21 displays a three-dimensional image as defined by designed values.

Note that the panel optical axis refers to a line connecting the center of the display surface of the displaying device 21 and the middle of the viewing zone S. In this embodiment, the angle shift between the panel optical axis according to the design and the actual panel optical axis is represented by Φ. If Φ that is the angle shift is "0" (Φ=0), the set position of the viewing zone S according to the design and the actual set position of the viewing zone S are coincident.

The first coordinate system is a coordinate system fixed to the displaying device 21. Thus, the first coordinate system is a coordinate system changing with the movement of the displaying device 21. Specifically, the first coordinate system is a coordinate system in which the center of the display surface (display) of the displaying device 21 is the origin, the Z axis is set to the optical axis direction of the display surface, the X axis is set to the horizontal direction of the display surface, and the Y axis is set to the vertical direction of the display surface. In this embodiment, the height direction refers to the Y axis direction. The first coordinate in the real space may be any coordinate system fixed to the displaying device 21, and the method for setting the same is not limited to the above.

If the light beam controller 22 is provided in a manner that the relative position of the light beam controller 22 with respect to the display element 20 is shifted in the height direction as compared to that in FIG. 12, this shift may be handled as a shift in the lateral direction. This is because the shift is not distinguished from that in the lateral direction, considering the relation between the element images 24 and the optical openings of the light beam controller 22. In addition, when the optical openings of the light beam controller 22 are arranged in a direction coincident with the first direction of the display element 20, even if the relative position of the light beam controller 22 with respect to the display element 20 is shifted in the height direction, the shift need not be taken into account.

Referring back to FIG. 1, the detector 16 detects a viewer. The detector 16 may be any device that can detect a viewer. For example, a known detecting device such as a radar or a sensor as well as an imaging device such as a visible camera or an infrared camera is used as the detector 16.

The detector 16 may also be installed at a position different from that according to the design. In this case, if the position of a viewer is located on the basis of a detection result of the detector 16, the position of the viewer located on the basis of the detection result of the detector 16 may be deviated from the actual position of the viewer.

In the image display apparatus 10, if the actual panel optical axis is deviated from the panel optical axis according to the design in the displaying device 21 of the display device 14 as described above, the actual set position of the viewing zone S is deviated from the set position of the viewing zone S according to the designed values. Similarly, as for the detector 16, if the install position, the install direction and the like of the detector 16 are deviated from designed values, the position of the viewer obtained from the detection result of the detector 16 will be deviated.

Therefore, the image processing device 12 of this embodiment calculates a correction value for at least one of the set position of the viewing zone set by the display device 14 or the position (a second position) of the viewer in a second coordinate system obtained on the basis of the detection result of the detector 16.

The second coordinate system is a coordinate system fixed to the detector 16 and changing with the movement of the detector 16. Specifically, it is assumed that the detector 16 is an imaging device. In this case, the second coordinate system has its origin at the install position of the imaging device in the real space. In addition, the second coordinate system is a coordinate system in which the camera optical axis is the Z' axis, a line in the real space intersecting the Z' axis and corresponding to the horizontal direction in a captured image is the X' axis, and a line in the real space intersecting with the Z' axis and corresponding to the perpendicular direction in the captured image is the Y' axis. If the detector 16 is an imaging device, the second coordinate system may be referred to as a camera coordinate system. If the detector 16 is a device other than imaging devices, the install position of the device may be set as the origin. In addition, the measurement direction of the device may be set to the Z' axis, and the X' axis and the Y' axis may be set similarly to the above.

The second coordinate in the real space may be any coordinate system fixed to the detector 16, and the method for setting the same is not limited to the above.

In this embodiment, position coordinates in the second coordinate system are represented by (X', Y', Z'). In addition, the designed position (the position according to the design) of the detector 16 in the first coordinate system is expressed as C=(Xc, Yc, Zc).

An angle between the X axis of the first coordinate system and a line obtained by projecting the X' axis of the second coordinate system onto the XY plane along the Z' axis of the second coordinate system is represented by $\psi$. An angle between the YZ plane and the Y'Z' plane where the angle $\psi$ is "0" ($\psi$=0) is represented by $\theta X$. In addition, an angle between the XZ plane and the X'Z' plane is represented by $\theta Y$. Then, the posture of the detector 16 can be expressed as ($\psi$, $\theta X$, $\theta Y$).

Note that $\psi$ corresponds to the rotation angle of the optical axis of the detector 16. $\theta X$ corresponds to the orientation in the lateral direction of the detector 16, namely the pitch angle. $\theta Y$ corresponds to the orientation in the vertical direction of the detector 16, namely the yaw angle.

Figure 14:
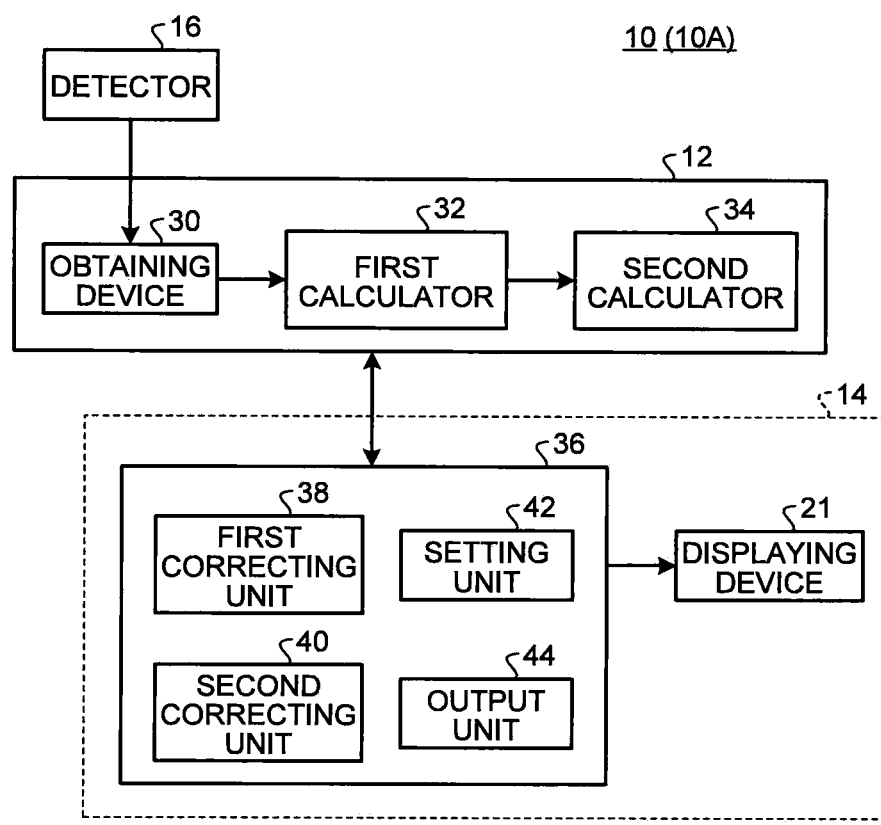
FIG. 14 is a diagram illustrating a functional configuration of the image display apparatus according to the first embodiment.

Next, a functional configuration of the image display apparatus 10 will be described. FIG. 14 is a block diagram illustrating a functional configuration of the image display apparatus 10.

As illustrated in FIG. 14, the image processing device 12 includes an obtaining device 30, a first calculator 32, and a second calculator 34.

The obtaining device 30 obtains a detection result for the detector 16. The obtaining device 30 obtains the second position that is a position of the viewer in the second coordinate system on the basis of the detection result obtained from the detector 16. The obtaining device 30 then outputs the second position that is the obtainment result to the first calculator 32.

The obtaining device 30 obtains the second position of the viewer from the detection result of the detector 16 by using a known method. For example, the detector 16 is a visible camera, and the obtaining device 30 receives a captured image of the viewer as the detection result from the detector 16. In this case, the obtaining device 30 obtains the second position of the viewer by image analysis of the captured image received from the detector 16. Alternatively, the detector 16 is assumed to be a radar. In this case, the obtaining device 30 obtains the second position of the viewer by signal processing of a radar signal received from the detector 16. When the obtaining device 30 obtains the second position of the viewer in the second coordinate system, an object that can be determined as a human such as a face, a head, an entire person or a mark included in the captured image may be detected as the viewer. Note that the method for obtaining the second position of the viewer in the second coordinate system by the obtaining device 30 is not limited to these methods.

The first calculator 32 stores in advance the first position of the displaying device 21 in the first coordinate system. The first position is the set position of the viewing zone according to the designed values. In the display device 14, if correction process, which will be described later, is not performed by a control unit 36, a three-dimensional image with a region including the first position being the set position of the viewing zone is displayed on the displaying device 21. The first calculator 32 stores in advance the same information as the first position that is the designed values used at the displaying device 21. Alternatively, the first calculator 32 may obtain information representing the first position from the display device 14.

Then, the first calculator 32 calculates a difference between the first position of the displaying device 21 in the first coordinate system and the second position of the viewer in the second coordinate system obtained from the obtaining device 30. Specifically, the first calculator 32 calculates a difference between position coordinates of the first position in the first coordinate system and position coordinates obtained by transformation of the second position in the second coordinate system to that in the first coordinate system. Note that the first calculator 32 needs only to calculate a difference between the first position and the second position transformed to become in the same coordinate system. In other words, the first calculator 32 may calculate a difference between position coordinates obtained by transforming the first position in the first coordinate system into that in the second coordinate system and position coordinates of the second position of the viewer in the second coordinate system. Accordingly, "a difference between the first position of the displaying device 21 in the first coordinate system and the second position of the viewer in the second coordinate system obtained from the obtaining device 30" means a difference obtained after transforming the first position and the second position to become in the same coordinate system.

The first calculator 32 outputs the calculated difference to the second calculator 34.

The second calculator 34 obtains the difference between the first position and the second position from the first calculator 32. The second calculator 34 then calculates a correction value for at least one of the set position of the viewing zone of the displaying device 21 and the second position of the viewer. The correction value is a value for correcting at least one of the set position of the viewing zone and the second position of the viewer so as to compensate for the difference between the first position and the second position.

The image processing device 12 outputs the second position of the viewer in the second coordinate system obtained by the obtaining device 30 or the second position of the viewer transformed to that in the first coordinate system, and the correction value calculated by the second calculator 34 to the display device 14.

The display device 14 includes a control unit 36 and a displaying device 21.

The control unit 36 includes a first correcting unit 38, a second correcting unit 40, a setting unit 42, and an output unit 44.

The first correcting unit 38 corrects the second position of the viewer obtained from the image processing device 12 on the basis of the correction value received from the image processing device 12. With the first correcting unit 38, the second position of the viewer is corrected so as to compensate for the difference between the first position and the second position.

The second correcting unit 40 stores the first position in advance. The second correcting unit 40 corrects the set position of the viewing zone set on the basis of the first position on the basis of a correction value received from the image processing device 12. With the second correcting unit 40, the set position of the viewing zone set on the basis of the first position is corrected so as to compensate for the difference between the first position and the second position.

The setting unit 42 sets the viewing zone to the set position obtained by the correction by the second correcting unit 40.

The output unit 44 controls the displaying device 21 so that the viewing zone is set to the set position set by the setting unit 42. Specifically, the output unit 44 displays a parallax image on the display element 20 and controls various display parameters of the displaying device 21 so that the viewing zone is set to the set position set by the setting unit 42.

Note that the output unit 44 controls the displaying device 21 so that the viewing zone is set to a region containing the first position that is the set value when displaying a test pattern, which will be described later. Specifically, the output unit 44 displays a test pattern on the display element 20 and controls various display parameters of the displaying device 21 in a manner that the region containing the first position becomes the set position of the viewing zone.

Figure 15:
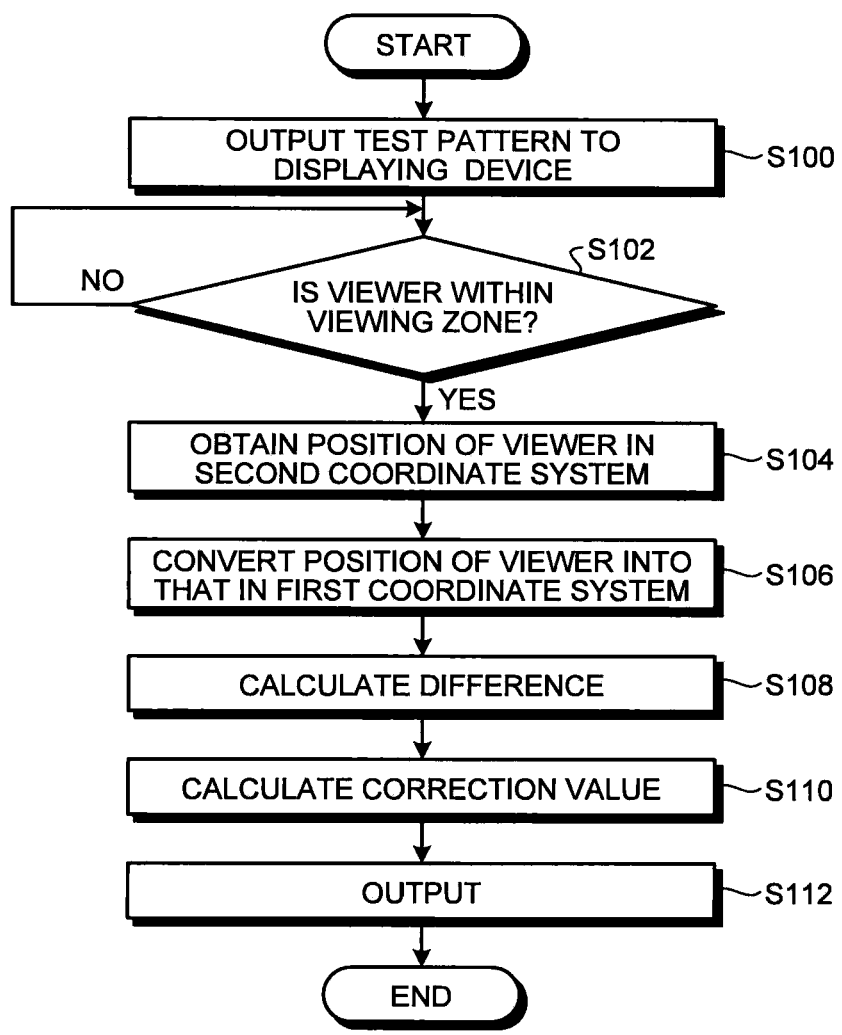
FIG. 15 is a flowchart of image processing according to the first embodiment.

Next, procedures of image processing performed by the image display apparatus 10 will be described. FIG. 15 is a flowchart illustrating the procedures of image processing performed by the image display apparatus 10.

Note that, in this embodiment, the description will be made assuming that errors ($\theta X$, $\theta Y$) of the displaying device 21 and the detector 16 are present. Moreover, this embodiment will be described assuming that there is no error in the optical axis rotation of the detector 16 (the angle $\psi=0$).

First, the output unit 44 outputs a test pattern stored in advance to the displaying device 21 (step S100). The test pattern is a parallax image with a region containing the first position $P0(X_0, Y_0, Z_0)$ in the first coordinate system being set to the set position of the viewing zone.

Note that the test pattern is an image used for determining whether or not the viewer can view stereoscopically. Examples of the test pattern include a parallax image containing regions appearing to come out and regions appearing to be deep, which is a typical three-dimensional image, a parallax image with a particular parallax made to shine, a parallax image with different colors for different parallaxes, and an image with colors only for particular combinations of parallaxes. The test pattern only needs to be such a combination of images that it can be confirmed that different ones thereof reach to the left and right eyes of the viewer, respectively, and is not limited to the above image.

Next, the obtaining device 30 determines whether or not the viewer i is within the viewing zone set in the real space by the process of step S100 described above (step S102). In other words, the obtaining device 30 determines whether or not the viewer i is within the viewing zone where the three-dimensional image displayed on the displaying device 21 by the process of step S100 described above can be viewed normally. Then, the obtaining device 30 repeats negative determination (No in step S102) until it is determined to be positive (Yes in step S102).

The obtaining device 30 may perform the determination in step S102 by determining whether or not a predetermined time has passed since the process of step S100 described above is performed, for example. Alternatively, the obtaining device 30 may perform the determination in step S102 by receiving a detection result from the detector 16 or a detector separately provided for detecting a viewer, and determining whether or not the position of the viewer calculated from the detection result is within the set position of the viewing zone set to the region containing the first position $P0(X_0, Y_0, Z_0)$ in the first coordinate system, for example.

In addition, the image display apparatus 10 is also provided with an operating device configured to transmit a signal to the image processing device 12 as a result of an operating instruction by a viewer. A known remote controller or the like is used as the operating device. Then, when the viewer comes within the set position of the viewing zone set to the region containing the first position $P0(X_0, Y_0, Z_0)$, the viewer performs operating instruction with a button or the like indicating completion of positional shift provided on the operating device to transmit a signal indicating the completion of positional shift from the operating device to the image processing device 12. Note that a message prompting to operate the button indicating completion of positional shift may be displayed on the displaying device 21 when the viewer comes within the region where the viewer can view a three-dimensional image normally. This message may be displayed on the displaying device 21 for a predetermined time period after the process of step S100. Then, the image processing device 12 may make positive determination in step S102 when the signal indicating the completion of positional shift is received from the operating device.

Note that the state where the viewer can view a three-dimensional image normally depends on the test pattern displayed on the displaying device 21. For example, if the test pattern is a normal three-dimensional image, the state is one in which good stereoscopic viewing is achieved. If the test pattern is an image in which red is used for an image for the left eye and green is used for an image for the right eye, the state is one in which the color of the image seen by the left eye of the viewer is red and the color of the image seen by the right eye of the viewer is green.

Next, the obtaining device 30 obtains the second position that is the position of the viewer in the second coordinate system from the detection result of the detector 16 (step S104). In this embodiment, the obtaining device 30 detects the second position Pi'(Xi', Yi', Zi').

Next, the first calculator 32 transforms the second position Pi'(Xi', Yi', Zi') obtained in step S104 to that in the first coordinate system (step S106). In this embodiment, it is assumed the detector 16 is installed as designed, and the first calculator 32 transforms the second position in the second coordinate system to that in the first coordinate system and calculates the second position Pi(Xi, Yi, Zi) resulting from the transformation.

Specifically, the first calculator 32 transforms the second coordinate system to the first coordinate system by the following method. For simplification of the description, the description will be made assuming that the design satisfies $\psi=\theta X=\theta Y=0$ in the image display apparatus 10.

The coordinate transformation from the second coordinate system to the first coordinate system is performed by using the following formula (2) according to a known simple geometric transformation, for example:

$$\begin{cases} Xi = X_i' - Xc \\ Yi = Y_i' - Yc \\ Zi = Z_i' - Zc \end{cases} \quad (2)$$

In the formula (2), Xi, Yi, and Zi represent the X-coordinate, the Y-coordinate and the Z-coordinate, respectively, of the second position resulting from the transformation to the first coordinate system. In the formula (2), Xi', Yi', and Zi' represent the X'-coordinate, the Y'-coordinate and the Z'-coordinate, respectively, of the second position in the second coordinate system. In addition, in the formula (2), Xc, Yc and Zc represent the X-coordinate, the Y-coordinate and the Z-coordinate, respectively, of the designed position (the position according to the design) of the detector 16 in the first coordinate system.

Note that the coordinate transformation from the second coordinate system to the first coordinate system can be performed by a known simple geometric transformation even if the relation of $\psi=\theta X=\theta Y=0$ is not satisfied.

Next, the second calculator 34 calculates a difference $\Delta$ between the second position Pi(Xi, Yi, Zi) resulting from the transformation to the first coordinate system and the first position P0($X_0$, $Y_0$, $Z_0$) in the first coordinate system (step S108).

Figure 16:
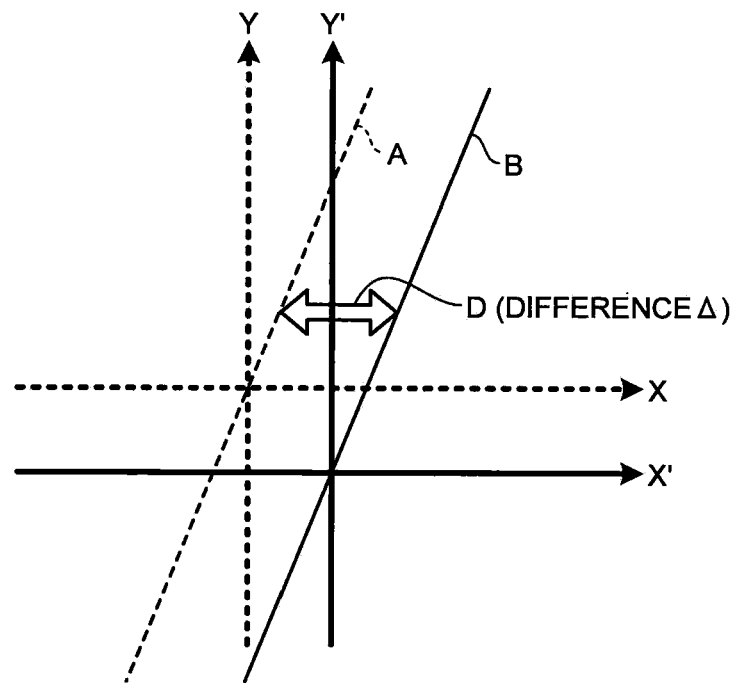
FIG. 16 is a diagram illustrating a difference $\Delta$ according to the first embodiment.

FIG. 16 is a schematic diagram illustrating the difference Δ. As illustrated in FIG. 16, the difference Δ may be any value representing the difference between a line A representing the extending direction of the viewing zone according to the design at a distance Z, and a line B representing the extending direction of the actual viewing zone.

The second calculator 34 calculates the difference Δ by the following method, for example. As a result of the process of step S102 described above, the viewer is present on the line B representing the extending direction of the actual viewing zone. Then, the second calculator 34 calculates, as the difference Δ, a shift amount between the line B representing the extending direction of the actual viewing zone that is a position of the viewer and the line A representing the extending direction of the viewing zone according to the design.

The second calculator 34 first sets the current position of the viewer to the height of the viewing zone.

Specifically, the second calculator 34 sets the second position Pi(Xi, Yi, Zi) resulting from the transformation to the first coordinate system in step S106 to the height of the viewing zone set in step S100. More specifically, the second calculator 34 sets the height by moving the second position Pi(Xi, Yi, Zi) of the viewer resulting from the transformation to the first coordinate system in step S106 along the vector R representing the direction along the optical openings of the light beam controller 22. Next, the second calculator 34 sets the distance of the viewer in the Z direction and the distance of the viewing zone in the Z direction, to correct the second position Pi(Xi, Yi, Zi) resulting from the transformation to the first coordinate system. Accordingly, the corrected position PI ($X_I$, $Y_I$, $Z_I$) of the viewer is expressed by the following formula (3):

$$\begin{cases} X_I = \frac{Z_0}{Zi}(Xi - \nabla(Yi - Y_0)) \\ Y_I = Y_0 \\ Z_I = Z_0 \end{cases} \quad (3)$$

In the formula (3), $\nabla$ represents the vector R. In the formula (3), $X_I$, $Y_I$, $Z_I$ represent the X-coordinate, the Y-coordinate and the Z-coordinate of the corrected position PI of the viewer. In addition, in the formula (3), Xi, Yi, and Zi represent the X-coordinate, the Y-coordinate and the Z-coordinate, respectively, of the second position resulting from the transformation to the first coordinate system. In the formula (3), $Y_0$ and $Z_0$ represent the Y-coordinate and the Z-coordinate, respectively, of the first position P0 in the first coordinate system.

The second calculator 34 then calculates the difference Δ by using the following formula (4):

$$\Delta = X_I - X_0 \quad (4)$$

Note that Δ in the formula (4) represents the difference. In the formula (4), $X_I$ is the same as in the formula (3). In addition, in the formula (4), $X_0$ represents the X-coordinate of the first position P0 in the first coordinate system.

Although the case where the second calculator 34 calculates the difference Δ by correcting the second position Pi(Xi, Yi, Zi) of the viewer resulting from the transformation to the first coordinate system, the first position P0 in the first coordinate system may be corrected and the difference may be obtained thereby.

Moreover, although the difference Δ is represented as a distance in the X-axis direction in the real space, the difference Δ only needs to be a difference in the X-axis direction and is not limited to one in the real space. For example, the difference Δ may be a difference in the X-axis direction in a captured image obtained from the detector 16.

Referring back to FIG. 15, the second calculator 34 next calculates, on the basis of the difference Δ calculated in step S108, a correction value for at least one of the set position of the viewing zone set by the displaying device 21 or the second position so as to compensate for the difference Δ (step S110).

In this embodiment, a case where the second calculator 34 calculates the correction value for correcting the second position of the viewer obtained by the obtaining device 30 will be described.

Figure 17:
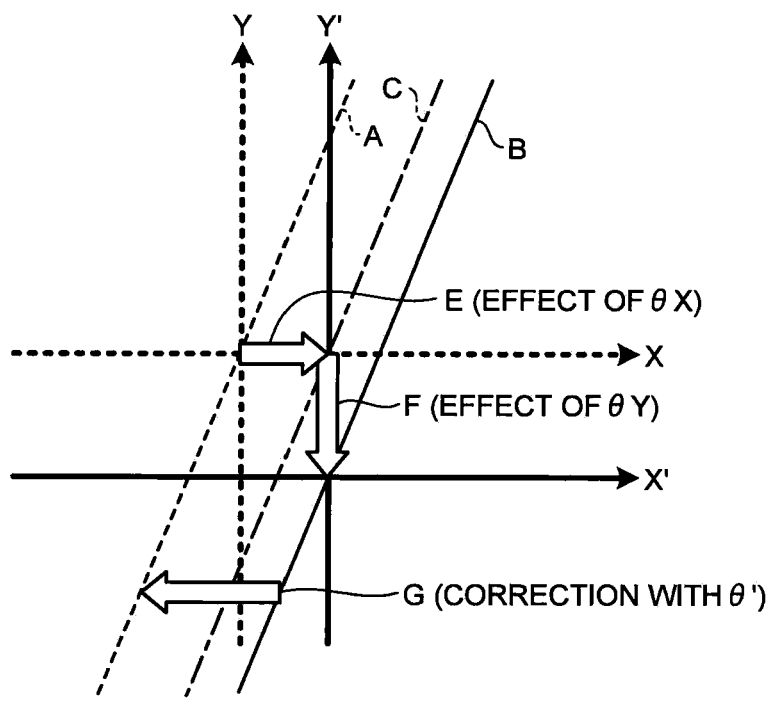
FIG. 17 is a diagram illustrating a method for calculating a correction value $\theta'$ according to the first embodiment.

FIG. 17 is a schematic diagram illustrating a method for calculating the correction value θ'. Note that the cause of the difference Δ is θX and θY that are installation errors of the detector 16. A line C representing the extending direction of the viewing zone where θY is 0 (θY=0) shifts laterally from the line A for a distance E. In addition, the line C is shifted to the position of the line B for a distance F by the effect of θY. The line A is a line representing the extending direction of the viewing zone according to the design at the distance Z. The line B is a line representing the extending direction of the actual viewing zone. The correction value θ' may be a numerical value G for making the line A and the line B overlap with each other.

Although the correction value θ' can also be calculated by using θX and θY that are installation errors of the detector 16, it is not necessary to obtain both of θX and θY. Specifically, the correction value θ' may be a numerical value for making the line B and the line A overlap with each other. In the second calculator 34, the correction value θ' may be calculated by using the following formula (5):

$$\theta' = \arctan\left(\frac{\Delta}{Z_0}\right) \quad (5)$$

Although the case where only the X-axis direction is corrected is illustrated in the schematic diagram of FIG. 17, the correction is not limited to this form. The second calculator 34 may calculate the correction value θ' as a correction value for correcting the Y-axis direction, or may calculate the correction value θ' as a correction value for correcting both the X-axis and Y-axis directions.

The image processing device 12 then outputs the correction value θ' calculated in step S110 and the second position of the viewer in the second coordinate system obtained in step S104 or the second position obtained by transforming the second position to the first coordinate system to the display device 14 (step S112). Then, this routine is terminated.

Figure 18:
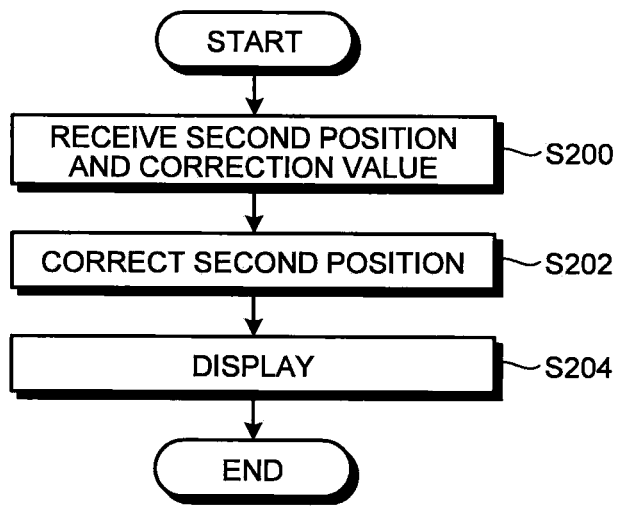
FIG. 18 is a flowchart of correction process according to the first embodiment.

Next, correction process performed by the display device 14 will be described. FIG. 18 is a flowchart illustrating procedures of the correction process performed by the display device 14.

The control unit 36 receives, from the image processing device 12, the correction value θ' and the second position of the viewer in the second coordinate system or the second position obtained by transforming the second position to the first coordinate system (step S200).

Note that, in step S200, a case where the second position obtained by transforming the second position of the viewer in the second coordinate system to that in the first coordinate system is received from the image processing device 12 will be described as an example. In addition, in step S200, a case where a correction value for correcting the second position is received as the correction value θ' from the image processing device 12 will be described.

Next, the second correcting unit 40 corrects the second position (step S202). Specifically, the second correcting unit 40 corrects the second position of the viewer in the first coordinate system obtained in step S200 by using the correction value θ' received in step S200.

A case where the second correcting unit 40 corrects the second position of the viewer in the first coordinate system by handling the correction value θ' as a shift of the detector 16 in the lateral direction will be described here. In this case, the second correcting unit 40 calculates the second position Si(Xsi, Ysi, Zsi) of the viewer in the first coordinate system resulting from the correction by using the following formula (6):

$$\begin{cases} Xsi = (X_i'\cos\theta' - Z_i'\sin\theta') - Xc \\ Ysi = Y_i' - Yc \\ Zsi = (X_i'\sin\theta' + Z_i'\cos\theta') - Zc \end{cases} \quad (6)$$

In the formula (6), Xsi, Ysi and Zsi represent the X coordinate, the Y coordinate and the Z coordinate, respectively of the second position of the viewer in the first coordinate system resulting from the correction. In the formula (6), Xi', Yi' and Zi' represent the X coordinate, the Y coordinate and the Z coordinate, respectively of the second position of the viewer in the first coordinate system before the correction. In the formula (6), Xc, Yc and Zc represent the X coordinate, the Y coordinate and the Z coordinate, respectively of the designed position of the detector 16 in the first coordinate system. In addition, in the formula (6), θ' represents the correction value received in step S200.

Note that the second correcting unit 40 may store in advance the information representing the designed position of the detector 16 (that is, Xi', Yi' and Zi' in the formula (6)).

When the detector 16 is an imaging device, the correction using the formula (6) described above corresponds to correction of the yaw angle and the pitch angle of the imaging device.

Alternatively, the second correcting unit 40 may obtain the captured image used for obtaining the second position together with the second position from the obtaining device 30, and correct the second position in the captured image. In this case, the correction value θ' obtained from the image processing device 12 is a representation that is correctable in the captured image.

Next, the output unit 44 displays an image containing the second position Si(Xsi, Ysi, Zsi) of the viewer in the first coordinate system obtained by the correction in step S202 described above and the set position (a region containing the first position) of the viewing zone in the pattern image used in step S100 described above on the displaying device 21 (step S204), and this routine is terminated. If the second position Si and the set position of the viewing zone containing the first position are shifted from each other, it is preferable that the image output in step S204 contain text information or an image of an arrow indicating that the set position of the viewing zone in the real space and the position of the viewer are shifted from each other.

As a result of the process in step S204, the second position Si of the viewer in the first coordinate system resulting from the correction and the set position of the viewing zone at the displaying device 21 are displayed on the displaying device 21. It is therefore possible to present to the viewer that the set position of the viewing zone in the real space and the position of the viewer are shifted from each other.

In the display process illustrated in FIG. 18, a case where the second position Si of the viewer in the first coordinate system resulting from the correction and the set position of the viewing zone at the displaying device 21 are displayed on the displaying device 21 is described. Such information, however, may be output to a device outputting audio and be output as audio therefrom.

In the display process illustrated in FIG. 18, a case where the second position Si of the viewer in the first coordinate system resulting from the correction and the set position of the viewing zone at the displaying device 21 are displayed on the displaying device 21 is described. However, the second position of the viewer in the first coordinate system before the correction and the set position of the viewing zone resulting from the correction may be displayed on the displaying device 21.

Figure 19:
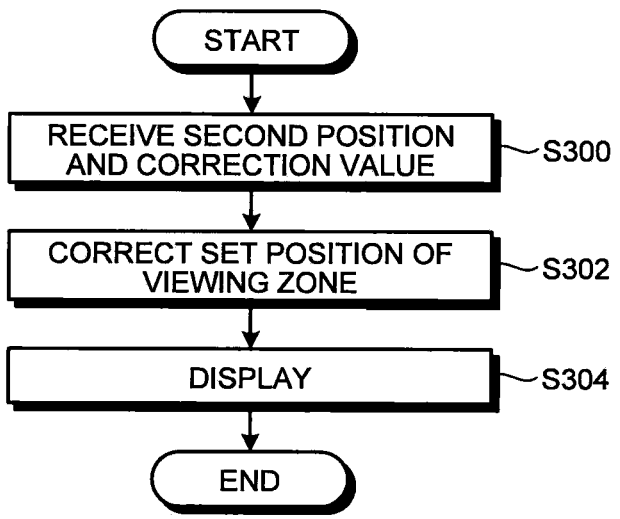
FIG. 19 is a flowchart of correction process according to the first embodiment.

In this case, the display device 14 may perform the correction process illustrated in FIG. 19. FIG. 19 is a flowchart illustrating the procedures different from those in FIG. 18 of the correction process performed by the display device 14.

The control unit 36 receives, from the image processing device 12, the correction value θ' and the second position of the viewer in the second coordinate system or the second position obtained by transforming the second position to the first coordinate system (step S300).

Note that, in step S300, a case where the second position obtained by transforming the second position of the viewer in the second coordinate system to that in the first coordinate system is received from the image processing device 12 will be described as an example. In addition, in step S300, a case where a correction value for correcting the set position of the viewing zone is received as the correction value θ' from the image processing device 12 will be described.

Next, the second correcting unit 40 corrects the set position of the viewing zone (step S302). Specifically, the second correcting unit 40 sets the set position of the viewing zone that is currently set, that is, the set position of the viewing zone that is set to a region containing the first position to a position shifted by the correction value θ' received in step S300.

Next, the output unit 44 displays an image containing the set position of the viewing zone resulting from the correction in step S302 described above and the second position of the viewer in the first coordinate system received in step S300 described above on the displaying device 21 (step S304), and this routine is terminated. When the second position Si and the set position of the viewing zone resulting from the correction are shifted from each other, the image output in step S304 preferably contains information indicating that the set position of the viewing zone in the real space and the position of the viewer are shifted from each other.

As a result of the process in step S304, the set position of the viewing zone resulting from the correction and the current second position of the viewer in the first coordinate system are displayed on the displaying device 21. It is therefore possible to present to the viewer that the set position of the viewing zone in the real space and the position of the viewer are shifted from each other.

In the display device 14, a three-dimensional image obtained by correcting the set position of the viewing zone on the basis of the correction value θ' received from the image processing device 12 may be displayed. In this case, the correction corresponds to correction of an error of the panel optical axis of the displaying device 21.

Figure 20:
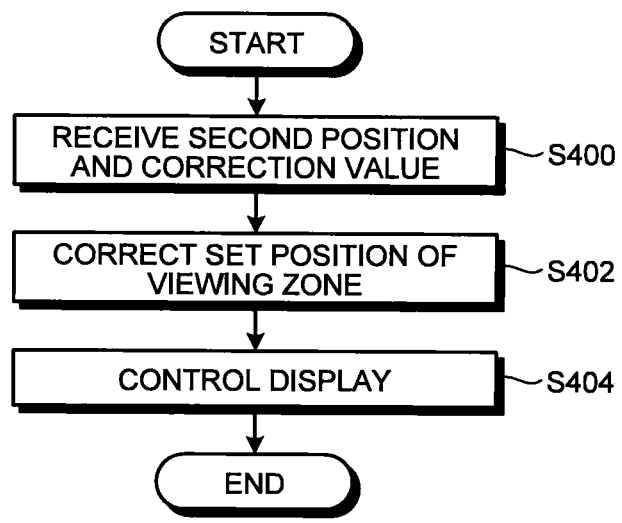
FIG. 20 is a flowchart of correction process according to the first embodiment.

In this case, the display device 14 may perform correction process illustrated in FIG. 20. FIG. 20 is a flowchart illustrating procedures different from those in FIGS. 18 and 19 of the correction process performed by the display device 14.

The control unit 36 receives, from the image processing device 12, the correction value θ' and the second position of the viewer in the second coordinate system obtained in step S104 or the second position obtained by transforming the second position to the first coordinate system (step S400).

Note that, in step S400, a case where the second position obtained by transforming the second position of the viewer in the second coordinate system to that in the first coordinate system is received from the image processing device 12 will be described as an example. In addition, in step S400, a case where a correction value for correcting the set position of the viewing zone is obtained as the correction value θ' from the image processing device 12 will be described.

Next, the second correcting unit 40 corrects the set position of the viewing zone (step S402). Note that the process in step S402 is the same as that in step S302.

Next, the output unit 44 controls the displaying device 21 so that the viewing zone is set to the set position of the viewing zone obtained by the correction in step S402 described above (step S404), and this routine is terminated. Specifically, the output unit 44 obtains a combination of display parameters for the displaying device 21 for setting the set position of the viewing zone set to the region containing the first position to a position shifted by the correction value θ' received in step S400. The output unit 44 may store in advance combinations of the display parameters associated with set positions of the viewing zone. The output unit 44 then controls the displaying device 21 so that the viewing zone is set to the set position of the viewing zone resulting from the correction in step S402 described above by adjusting the positional relation of the display element 20 and the light beam controller 22, the shape and the orientation of the displaying device 21, or the like according to the obtained display parameters.

As a result of the process in step S404, the image display apparatus 10 according to this embodiment can easily adjust the set position of the viewing zone so that the viewer can well view a three-dimensional image.

In the image display apparatus 10, the correction value θ' may be received from the image processing device 12 and the install position and the posture of the detector 16 may be adjusted on the basis of the received correction value θ'. In this case, the image processing device 12 outputs a correction value for correcting the second position as the correction value θ' to a drive unit configured to adjust the install position and the posture of the detector 16. A position changing member combining devices such as a known motor is used for the drive unit, for example. In addition, the drive unit stores in advance information indicating drive amounts for devices corresponding to the correction value θ'. The drive unit that has received the correction value θ' then drives the devices for the drive amounts corresponding to the correction value θ' received from the image processing device 12. Accordingly, the image display apparatus 10 can adjust the install position and the posture of the detector 16 to the position and the posture with which the above difference are compensated for.

As described above, in the image display apparatus 10 according to the first embodiment, the control unit 36 controls the displaying device 21 so that the viewing zone is set to a region containing the first position in the first coordinate system of the displaying device 21. The obtaining device 30 of the image processing device 12 obtains, on the basis of the detection result obtained from the detector 16, the second position that is the position of the viewer in the second coordinate system of the detector 16. The first calculator 32 calculates the difference Δ between the second position in the second coordinate system and the first position in the first coordinate system of the displaying device 21. The second calculator 34 calculates the correction value for at least one of the set position of the viewing zone and the second position so as to compensate for the difference Δ.

In this manner, in the image display apparatus 10 of this embodiment, the correction value for correcting at least one of the second position of the viewer in the second coordinate system of the detector 16 and the set position of the viewing zone that is set to a region containing the first position in the first coordinate system of the displaying device 21 is calculated on the basis of the difference Δ between the first position and the second position. Accordingly, with the image display apparatus 10 of the first embodiment, it is possible to obtain the correction value compensating for errors of design values between the detector 16 and the displaying device 21 even if an installation error of the detector 16 and a design error of the displaying device 21 occur at the same time.

With the image display apparatus 10 of the first embodiment, therefore, a correction value for adjusting errors of the displaying device 21 and the detector 16 can be easily obtained.

Second Embodiment

In a second embodiment, a case where a correction value for correcting the optical axis rotation amount of the detector 16 is also obtained will be described.

Since the functional configuration of an image display apparatus 10A in this embodiment is the same as that in the first embodiment (see FIG. 14), detailed description thereof will not be repeated.

Figure 21:
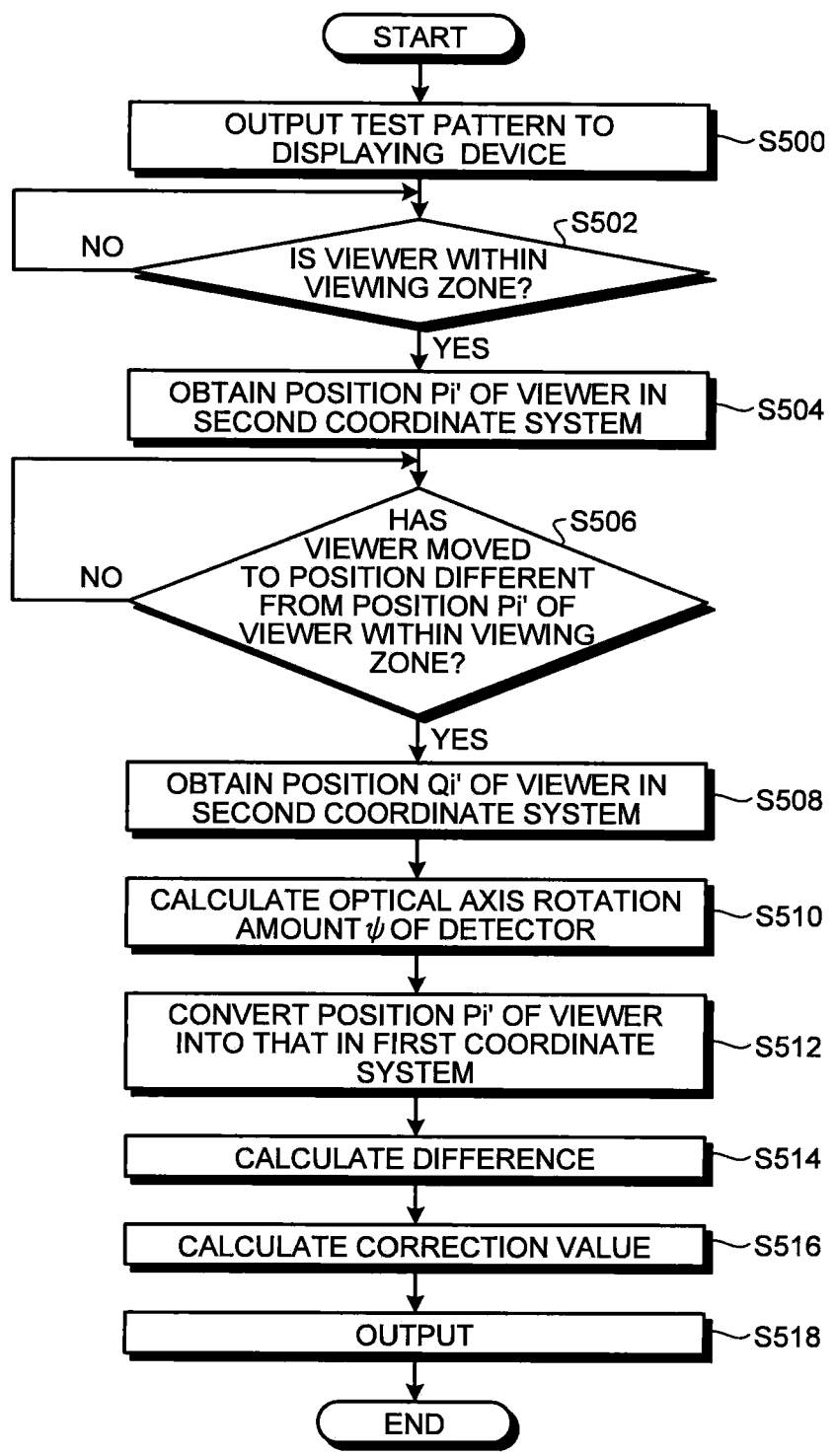
FIG. 21 is a flowchart of image processing according to a second embodiment.

Procedures of image processing performed by the image display apparatus 10A will be described. FIG. 21 is a flowchart illustrating procedures of the image processing performed by the image display apparatus 10A.

Note that, in this embodiment, the description will be made assuming that errors (θX, θY) of the displaying device 21 and the detector 16 are present. In addition, in this embodiment, the description will be made assuming that an error of the optical axis rotation of the detector 16 is also present (angle ψ≠0).

With the image display apparatus 10A, processes in steps S500 to S504 are performed similarly to steps S100 to S104 in the first embodiment. Specifically, the output unit 44 first outputs a test pattern stored in advance to the displaying device 21 (step S500).

Next, the obtaining device 30 determines whether or not a viewer is within a viewing zone set in the real space by the process of S500 described above, and repeats negative determination (No in step S502) until it is determined to be positive (Yes in step S502).

Next, the obtaining device 30 obtains a second position that is the position of the viewer in the second coordinate system of the detector 16 from the detection result of the detector 16 (step S504). In this embodiment, a second position Pi'(Xi', Yi', Zi') is detected as the second position that is the position of the viewer in the second coordinate system.

Next, the obtaining device 30 determines whether or not the viewer i has moved to a position within the viewing zone set in the real space by the process of step S500 described above and different from the position Pi' of the viewer obtained in step S504 (step S506). The obtaining device 30 then repeats negative determination (No in step S506) until it is determined to be positive (Yes in step S506).

The obtaining device 30 may perform the determination of step S504 by determining whether or not a predetermined time has passed from the process of step S504 described above. Alternatively, the obtaining device 30 may perform the determination of step S506 by receiving a detection result from the detector 16 or a detector separately provided for detecting the viewer, and determining whether the position of the viewer included in the detection result is within the set position of the viewing zone set to a region containing the first position P0($X_0$, $Y_0$, $Z_0$) in the first coordinate system and different from the position Pi' of the viewer obtained in step S504, for example.

In addition, the image display apparatus 10A is also provided with an operating device configured to transmit a signal to the image processing device 12 as a result of an operating instruction by a viewer. A known remote controller or the like is used as the operating device. Then, when the viewer moves to a position different from that in step S504 within the set position of the viewing zone set to the region containing the first position P0($X_0$, $Y_0$, $Z_0$), the viewer performs operating instruction with a button or the like indicating completion of positional shift provided on the operating device. At this time, a signal indicating the completion of positional shift is transmitted from the operating device to the image processing device 12. Note that information prompting to move to a position where the viewer can view a three-dimensional image normally and a message prompting to operate the button indicating completion of positional shift when the movement is completed may be displayed on the displaying device 21. This message may be displayed on the displaying device 21 for a predetermined time period after the process of step S504. Then, the image processing device 12 may make positive determination in step S506 when the signal indicating the completion of positional shift is received from the operating device.

Next, the obtaining device 30 obtains the second position that is the position of the viewer in the second coordinate system from the detection result of the detector 16 (step S508). In this embodiment, a second position Qi'(Zqi', Yqi', Zqi') is obtained as the second position that is a position of the viewer in the second coordinate system and different from the second position Pi'.

Next, the first calculator 32 calculates the optical axis rotation amount $\psi$ of the detector 16 from a line (a third line) passing through the second position Pi' obtained in step S504 and the second position Qi' obtained in step S508 and a vector R (a first line) being the slope of the light beam controller 22 (step S510).

Figure 22:
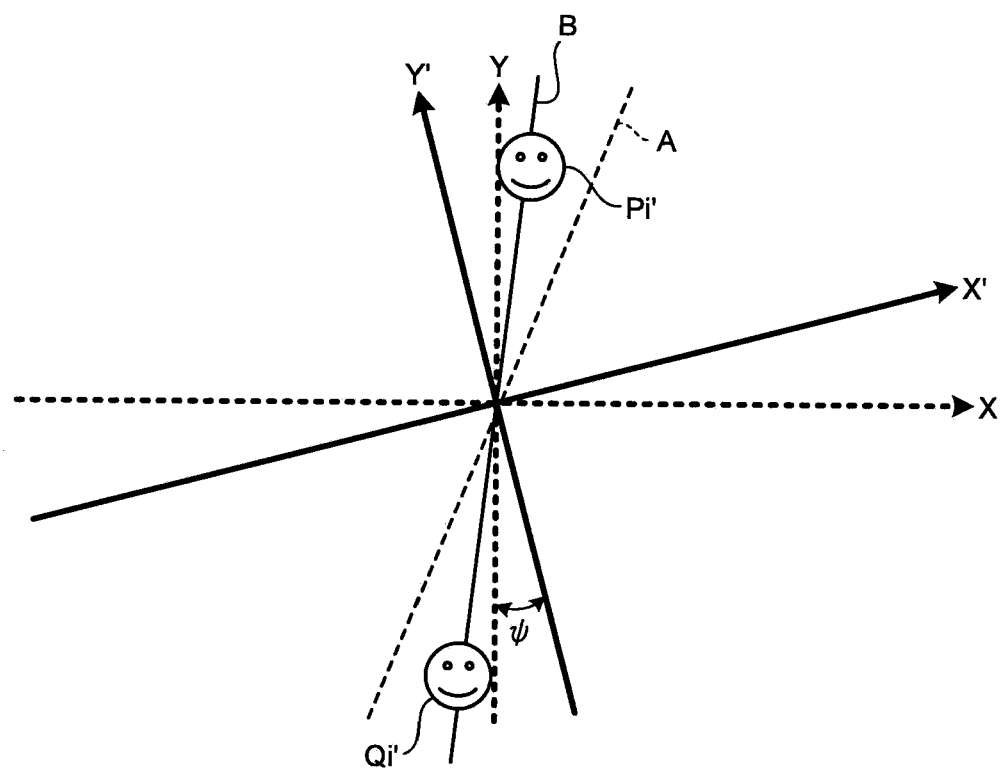
FIG. 22 is a diagram illustrating the relation among second positions, a slope R and an optical axis rotation amount $\psi$.

FIG. 22 is a schematic diagram illustrating the relation among the second position Pi', the second position Qi', the slope R of the light beam controller 22 and the optical axis rotation amount $\psi$ of the detector 16. For simplification of the description, it is assumed in FIG. 22 that Xc=Yc=θX=θY=0 is satisfied.

As illustrated in FIG. 22, the optical axis rotation amount $\psi$ of the detector 16 appears as an angle between a line A (the first line) representing the extending direction of the viewing zone according to the design at a distance Z and a line B (the third line) representing the extending direction of the actual viewing zone. The slope of the line A is the same as the vector R that is the slope of the light beam controller 22. In addition, the line B is a line passing through the second position Pi' and the second position Qi'. Accordingly, the first calculator 32 obtains the optical axis rotation amount $\psi$ of the detector 16 by the following formula (7). In the formula (7), $\alpha$ is as expressed in the following formula (8):

$$\psi = \arctan\left(\nabla - \frac{X_i' - \alpha X_{qi}'}{Y_i - \alpha' Y_{qi}'}\right) \quad (7)$$

$$\alpha = \frac{Z_i'}{Z_{qi}'} \quad (8)$$

Referring back to FIG. 21, the first calculator 32 next transforms the second position Pi'(Xi', Yi', Zi') that is a position of the viewer in the second coordinate system obtained in step S504 to that in the first coordinate system (step S512). Thus, in this embodiment, the first calculator 32 assumes that the detector 16 is installed as designed, transforms the second position in the second coordinate system to that the first coordinate system, and calculates the second position Pi(Xi, Yi, Zi) resulting from the transformation.

The first calculator 32 transforms the second coordinate system to the first coordinate system by the following method.

For simplification of the description, the description will be made assuming that the design satisfies θX=θY=0 in the image display apparatus 10A.

The coordinate transformation from the second coordinate system to the first coordinate system is performed by using the following formula (9) according to a known simple geometric transformation, for example:

$$\begin{cases} Xi = (X_i'\cos\psi - Y_i'\sin\psi) - Xc \\ Yi = (X_i'\sin\psi + Y_i'\cos\psi) - Yc \\ Zi = Z_i' - Zc \end{cases} \quad (9)$$

In the formula (9), Xi, Yi, and Zi represent the X-coordinate, the Y-coordinate and the Z-coordinate, respectively, of the second position resulting from the transformation to the first coordinate system. In the formula (9), Xi', Yi', and Zi' represent the X'-coordinate, the Y'-coordinate and the Z'-coordinate, respectively, of the second position in the second coordinate system. In addition, in the formula (9), Xc, Yc and Zc represent the X-coordinate, the Y-coordinate and the Z-coordinate, respectively, of the designed position (installation position) of the detector 16 in the first coordinate system.

Note that the coordinate transformation from the second coordinate system to the first coordinate system can be performed by a known simple geometric transformation even if the relation of θX=θY=0 is not satisfied.

Next, the second calculator 34 calculates a difference Δ between the second position Pi(Xi, Yi, Zi) resulting from the transformation to the first coordinate system and the first position P0($X_0$, $Y_0$, $Z_0$) in the first coordinate system (step S514). The calculation of the difference Δ in step S514 may be performed similarly to that in step S108 (see FIG. 15) of the first embodiment.

Next, the second calculator 34 next calculates a correction value for at least one of the set position of the viewing zone set by the displaying device 21 or the second position so as to compensate for the difference Δ on the basis of the difference Δ calculated in step S514 (step S516). In this embodiment, the second calculator 34 calculates the correction value θ' described in the first embodiment and the optical axis rotation amount $\psi$ of the detector 16 calculated in step S510 described above as the correction values. The calculation of the correction value θ' may be performed similarly to that in step S110 (see FIG. 15) of the first embodiment.

The image processing device 12 then outputs the correction value θ' calculated in step S110, the optical axis rotation amount ψ of the detector 16, and the second position of the viewer in the second coordinate system obtained in step S104 or the second position obtained by transforming the second position to the first coordinate system to the display device 14 (step S518). Then, this routine is terminated.

In the display device 14, the set position of the viewing zone at the displaying device 21 may be corrected by performing correction process similar to that in the first embodiment on the basis of the correction value θ'.

In addition, in the display device 14, the second position of the viewer calculated on the basis of the detection result obtained from the detector 16 may be corrected on the basis of the correction value θ' and the optical axis rotation amount ψ of the detector 16.

In this case, the second correcting unit 40 may calculate the second position Si(Xsi, Ysi, Zsi) of the viewer in the first coordinate system resulting from the correction by using the following formula (10):

$$\begin{cases} Xi = (X'_i \cos\psi - Y'_i \sin\psi)\cos\theta' - Z'_i \sin\theta' - Xc \\ Yi = (X'_i \sin\psi + Y'_i \cos\psi) - Yc \\ Zi = (X'_i \cos\psi - Y'_i \sin\psi)\sin\theta' + Z'_i \cos\theta' - Zc \end{cases} \quad (10)$$

In the formula (10), Xi, Yi, Zi, Xi', Yi', Zi', Xc, Yc and Zc represent the same as those in the formula (9), respectively.

As described above, in the image display apparatus 10A of the second embodiment, the correction value for correcting at least one of the second position of the viewer in the second coordinate system of the detector 16 and the set position of the viewing zone that is set to a region containing the first position in the first coordinate system of the displaying device 21 so as to compensate for the difference Δ between the first position and the second position together with the other is calculated. Accordingly, with the image display apparatus 10A of the second embodiment, it is possible to obtain the correction value compensating for errors of design values between the detector 16 and the displaying device 21 even if an installation error of the detector 16 and a design error of the displaying device 21 occur at the same time.

With the image display apparatus 10A of the second embodiment, therefore, a correction value for adjusting errors of the displaying device 21 and the detector 16 can be easily obtained.

In this embodiment, the case where two second positions, which are the second position Pi' and the second position Qi', are obtained as the position of the viewer in the second coordinate system is described. With the image display apparatus 10A of this embodiment, however, two or more second positions within the viewing zone may be obtained, and the number of the second positions to be obtained is not limited to two.

Programs for performing the image processing and the correction process performed in the image display apparatus 10 and the image display apparatus 10A in the first and second embodiments are embedded in a ROM or the like and provided therefrom.

The programs for performing the image processing and the correction process performed in the image display apparatus 10 and the image display apparatus 10A in the first and second embodiments may be recorded on a computer readable recording medium such as CD-ROM, a flexible disk (FD), a CD-R, and a DVD (digital versatile disk) in a form of a file that can be installed or executed, and provided therefrom.

Furthermore, the programs for performing the image processing and the correction process performed in the image display apparatus 10 and the image display apparatus 10A in the first and second embodiments may be stored on a computer system connected to a network such as the Internet, and provided by being downloaded via the network. Alternatively, the programs for performing the image processing and the correction process performed in the image display apparatus 10 and the image display apparatus 10A in the first and second embodiments may be provided or distributed through a network such as the Internet.

The programs for performing the image processing and the correction process performed in the image display apparatus 10 and the image display apparatus 10A in the first and second embodiments have a modular structure including the respective units described above (the obtaining device 30, the first calculator 32, the second calculator 34, the first correcting unit 38, the second correcting unit 40, the setting unit 42 and the output unit 44). In an actual hardware configuration, a CPU (a processor) reads the programs from the ROM and executes the program, whereby the respective units described above are loaded on a main storage device and these respective functional units are generated on the main storage device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image display apparatus comprising:
   a displaying device capable of displaying a three-dimensional image;
   a detector configured to detect a viewer;
   an obtaining device configured to obtain, on the basis of a detection result from the detector, a second position of the viewer in a second coordinate system fixed to the detector;
   a first calculator configured to calculate a difference between a first position in a first coordinate system fixed to the displaying device and the second position;
   a second calculator configured to calculate a correction value for at least one of a set position of a viewing zone in which the viewer can view the three-dimensional image and the second position so as to compensate for the difference; and
   an output unit configured to output at least one of:
      first information indicating a relation between the set position of the viewing zone and the second position resulting from correction based on the correction value; and
      second information indicating a relation between the set position of the viewing zone resulting from the correction based on the correction value and the second position obtained by the obtaining device.

2. The apparatus according to claim 1, wherein the first calculator calculates, as the difference between the first position and the second position, a shift between a first line along an extending direction of the viewing zone set to a region containing the first position and a second line along an extending direction of the viewing zone set to a region containing the second position.

3. The apparatus according to claim 1, wherein the detector is an imaging unit configured to obtain a captured image of the viewer through imaging.

4. The apparatus according to claim 3, wherein the second calculator calculates, as the correction value, correction values of a yaw angle and a pitch angle of the imaging unit.

5. The apparatus according to claim 3, wherein
the obtaining device obtains a third position different from the second position of the viewer in the second coordinate system, and
the second calculator calculates, as a correction value for a roll angle of the imaging unit, an angle between a first line along an extending direction of the viewing zone set to a region containing the first position and a third line passing through the second position and the third position.

6. The apparatus according to claim 3, wherein the second calculator calculates, as the correction value, a correction value for correcting the second position of the viewer within the captured image.

7. The apparatus according to claim 1, further comprising:
a first correcting unit configured to correct the first position on the basis of the calculated correction value; and
a control unit configured to control the displaying device so that the viewing zone is set to the first position resulting from the correction.

8. The apparatus according to claim 1, further comprising a second correcting unit configured to correct the second position on the basis of the calculated correction value, wherein
the control unit controls the displaying device so that the second position resulting from the correction is the first position and the viewing zone is set to the first position.

9. An image display method, the method performed by an image processing device, the method comprising:
obtaining, by an obtaining device, on the basis of a detection result from a detector configured to detect a viewer, a second position of the viewer in a second coordinate system fixed to the detector;
calculating a difference between a first position in a first coordinate system fixed to a displaying device capable of displaying a three-dimensional image and the second;
calculating a correction value for at least one of a set position of a viewing zone in which the viewer can view the three-dimensional image and the second position so as to compensate for the difference; and
outputting at least one of:
first information indicating a relation between the set position of the viewing zone and the second position resulting from correction based on the correction value; and
second information indicating a relation between the set position of the viewing zone resulting from the correction based on the correction value and the second position obtained by the obtaining device.

10. A computer program product comprising a non-transitory computer-readable medium including programmed instructions, wherein the instructions, when executed by a computer, cause the computer to execute:
obtaining, by an obtaining device, on the basis of a detection result from a detector configured to detect a viewer, a second position of the viewer in a second coordinate system fixed to the detector;
calculating a difference between a first position in a first coordinate system fixed to a displaying device capable of displaying a three-dimensional image and the second position;
calculating a correction value for at least one of a set position of a viewing zone in which the viewer can view the three-dimensional image and the second position so as to compensate for the difference; and
outputting at least one of:
first information indicating a relation between the set position of the viewing zone and the second position resulting from correction based on the correction value; and
second information indicating a relation between the set position of the viewing zone resulting from the correction based on the correction value and the second position obtained by the obtaining device.

11. An image processing apparatus comprising:
an obtaining device configured to obtain, on the basis of a detection result from a detector configured to detect a viewer, a second position of the viewer in a second coordinate system fixed to the detector;
a first calculator configured to calculate a difference between a first position in a first coordinate system fixed to a displaying device capable of displaying a three-dimensional image and the second position;
a second calculator configured to calculate a correction value for at least one of a set position of a viewing zone in which the viewer can view the three-dimensional image and the second position so as to compensate for the difference; and
an output unit configured to output at least one of:
first information indicating a relation between the set position of the viewing zone and the second position resulting from correction based on the correction value; and
second information indicating a relation between the set position of the viewing zone resulting from the correction based on the correction value and the second position obtained by the obtaining device.

* * * * *